(12) United States Patent
Hagano et al.

(10) Patent No.: US 6,308,852 B1
(45) Date of Patent: Oct. 30, 2001

(54) TANK CAP AND FUEL TANK WITH THE SAME

(75) Inventors: Hiroyuki Hagano, Inazawa; Masayuki Nakagawa, Iwakura, both of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/525,010

(22) Filed: Mar. 14, 2000

(30) Foreign Application Priority Data

Mar. 31, 1999 (JP) .................................................. 11-091397

(51) Int. Cl.[7] .......................... B65D 41/04; B65D 90/22; B65D 90/38
(52) U.S. Cl. ........................ 220/293; 220/86.2; 220/89.1; 220/DIG. 33
(58) Field of Search .................................. 220/86.2, 86.1, 220/89.1, 288, 293, DIG. 33

(56) References Cited

U.S. PATENT DOCUMENTS

| | | | |
|---|---|---|---|
| 4,299,102 | * 11/1981 | Aro | 220/DIG. 33 |
| 4,765,505 | 8/1988 | Harris . | |
| 4,779,755 | * 10/1988 | Harris | 220/DIG. 33 |
| 5,183,173 | * 2/1993 | Heckman | 220/DIG. 33 |
| 5,449,086 | 9/1995 | Harris . | |
| 5,509,569 | * 4/1996 | Hiranuma et al. | 220/DIG. 33 |
| 5,638,975 | * 6/1997 | Harris | 220/288 |
| 5,794,806 | 8/1998 | Harris . | |
| 6,179,148 | * 1/2001 | Harris | 220/288 |

FOREIGN PATENT DOCUMENTS 6-88606    3/1994    (JP) .

* cited by examiner

Primary Examiner—Allan N. Shoap
Assistant Examiner—Niki M. Eloshway
(74) Attorney, Agent, or Firm—Pillsbury Winthrop LLP

(57) ABSTRACT

A fuel cap is set on a tank opening and includes a casing main body, a cover, and a torque mechanism. The torque mechanism includes a cover engagement projection disposed on the cover, a torque plate having a plate engagement element, and a spring. When the cover is rotated in a closing direction of the tank opening, the cover engagement projection is released from the plate engagement element under a certain rotational torque to provide the user with the feeling of a click. When the cover is rotated in an opening direction of the tank opening, on the other hand, the cover engagement projection is released from the plate engagement element under a smaller rotational torque. This arrangement enables the spring to accumulate the pressing force and release the accumulated pressing force. The release of the accumulated pressing force causes the positional relationship between the cover and the casing main body to an initial state.

14 Claims, 29 Drawing Sheets

TANK CAP AND FUEL TANK WITH THE SAME

BACKGROUND OF THE INVENTION

1. Field of the Invention

The present invention relates to a tank cap having a torque mechanism to close a tank opening by a predetermined rotational torque and a fuel tank with the tank cap attached thereto.

2. Description of Related Art

A known tank caps attached to a fuel tank of an automobile is disclosed in Japanese Patent Publication Gazette No. 6-88606. FIG. 36 is a sectional view illustrating a prior art tank cap 300. The tank cap 300 includes a plastic casing main body 302 that is screwed to a fuel supply inlet FNb of a fuel tank (not shown), a cover 330 that is attached to the casing main body 302, and a negative pressure valve 340 that is accommodated in a valve chest 304 formed in the casing main body 302 and regulates the pressure in the fuel tank. The negative pressure valve 340 includes a rubber valve disk 342, a valve support member 346 that has an opening 346a into which the valve disk 342 is fit, and a spring 348 that presses the valve disk 342. When the differential pressure between the tank pressure and the atmospheric pressure applied to the valve disk 342 exceeds a predetermined level, the valve disk 342 is set in an open position against the pressing force of the spring 348 in order to make the tank pressure closer to the atmospheric pressure.

A torque mechanism 320 is disposed between the upper portion of the casing main body 302 and the cover 330. While the casing main body 302 is attached to the fuel supply inlet FNb of the fuel tank, when the rotational torque applied to the cover 330 in the closing direction of the fuel supply inlet FNb exceeds a predetermined level, the torque mechanism 320 raises the cover 330 relative to the casing main body 302. This arrangement prevents the fuel supply inlet FNb from being closed with an excessively large force applied to the tank cap 300.

In the prior art structure discussed above, since many rotations of the tank cap are required to close the fuel supply inlet, this is rather troublesome. A proposed torque mechanism to solve this problem is capable of making the tank cap close the fuel supply inlet by a rotation of approximately 90 degrees. In the proposed technique, however, the positional relationship between the cover and the casing main body is gradually shifted in the rotating direction. A rather complicated operation is required for user to position the tank cap in the fuel supply inlet. This results in the poor operability of the tank cap.

SUMMARY OF THE INVENTION

The object of the present invention is thus to provide a tank cap that closes a tank opening by a single rotating operation and facilitates the positioning in the process of attachment and detachment.

At least part of the above and the other related objects are obtained by a tank cap that opens and closes a tank opening and engages with an opening engagement element disposed on a circumference of the tank opening. The tank cap includes a casing main body that seals the tank opening and has a casing engagement element, which engages with the opening engagement element with a rotation of the casing main body by a predetermined angle; a handle that is rotatably mounted on the casing main body and rotates the casing main body in either one of a closing direction of the tank opening and an opening direction of the tank opening; and a torque mechanism that is interposed between the handle and the casing main body and transmits a rotational torque applied to the handle to the casing main body. The torque mechanism includes a handle engagement element that is disposed on the handle; a torque plate that is interposed between the casing main body and the handle and has a plate engagement element, which engages with the handle engagement element; and a main body engagement element that is disposed on the casing main body and transmits a rotational torque from the torque plate to the casing main body. A state of the plate engagement element is changeable between an engagement state, a first non-engaged state, and a second non-engaged state. When the handle is rotated in the closing direction of the tank opening from a state where the casing engagement element is positioned at the opening engagement element, the plate engagement element falls into the engagement state, where the plate engagement element engages with the handle engagement element and the rotational torque applied to the handle is transmitted to the casing main body. When the casing engagement element of the casing main body engages with the opening engagement element and the rotational torque applied to the handle exceeds a predetermined level, the plate engagement element falls into the first non-engaged state, where the plate engagement element is released from the handle engagement element. When the handle is rotated in the opening direction of the tank opening from the state where the casing engagement element engages with the opening engagement element, the plate engagement element falls into the second non-engaged state, where the plate engagement element is released from the handle engagement element with a smaller rotational torque than the rotational torque required in the first non-engaged state.

In the tank cap of the present invention, the casing engagement element of the casing main body is positioned at the opening engagement element of the tank opening. The handle is then rotated in the closing direction of the tank opening. This enables the casing main body to rotate integrally with the handle via the torque mechanism so that the casing engagement element engages with the opening engagement element. In the engagement state where the plate engagement element of the torque mechanism engages with the handle engagement element of the handle, the plate engagement element transmits the rotational torque applied to the handle to the casing main body. When the casing engagement element engages with the opening engagement element and the rotational torque applied to the handle exceeds a predetermined level, the plate engagement element falls into the first engagement state, where the plate engagement element is released from the handle engagement element with the predetermined rotational torque. This arrangement enables the user to confirm that the tank opening is closed with the tank cap under a predetermined rotational torque.

While the tank cap closes the tank opening, when a rotational torque is applied to the handle in the opening direction of the tank opening, the plate engagement element falls into the second engagement state, where the plate engagement element is released from the handle engagement element with a smaller rotational torque than the rotational torque required in the first engagement state. The restoration force applied to the handle changes the state of the plate engagement element to the second engagement state and returns the positional relationship between the plate engagement element and the handle engagement element to the initial state. This arrangement keeps the positional relationship between the plate engagement element and the handle engagement element in the fixed state at each closing of the tank opening with the tank cap. This facilitates the positioning operation in the process of closing the tank opening.

In accordance with one preferred embodiment of the present invention, the torque plate has a cantilevered elastic torque piece with the plate engagement element. In one preferred embodiment, the elastic torque piece has one end that is movable between a non-support position and a support position to be supported by the main body engagement element, thereby changing the state of the plate engagement element between the first non-engaged state and the second nonengaged state. In another preferred embodiment, the elastic torque piece contacts the main body engagement element and transmits a rotational torque applied from the handle engagement element to the casing main body via the main body engagement element. The torque plate having one of these configurations does not require any complicated mechanism to exert the effects of the present invention.

In accordance with another preferred embodiment of the present invention, the torque mechanism has a spring that is interposed between the handle and the casing main body. The spring accumulates the pressing force in response to a rotation of the handle either in the closing direction of the tank opening or in the opening direction of the tank opening. The pressing force accumulated in the spring is released to return the positional relationship between the handle and the casing main body to the initial state.

The spring may have any structure that enables accumulation of the pressing force to rotate the handle relative to the casing main body. The spring may span between the torque plate and the handle or between the casing main body and the torque plate. Preferred examples of the spring include a torsion spring that utilizes a torsional force and a leaf spring. The spring may be a separate element from the casing main body and the torque plate, or alternatively, an extension or a part of the casing main body or the torque plate to generate the spring force.

It is preferable that the handle is manually operable and attached to the upper portion of the casing main body. One preferred example of the handle is a cover that covers the upper portion of the casing main body and has a handle, which is held by a thumb and an index finger of the user for a rotational operation.

The present invention is also directed to a fuel tank including a tank main body, in which a fuel is stored, a filler pipe having a tank opening, through which a supply of fuel is fed, and an opening engagement element that is disposed on a circumference of the tank opening, and a tank cap that opens and closes the tank opening and engages with the opening engagement element. The tank cap includes a casing main body that seals the tank opening and has a casing engagement element, which engages with the opening engagement element with a rotation of the casing main body by a predetermined angle; a handle that is rotatably mounted on the casing main body and rotates the casing main body either one of in a closing direction of the tank opening and in an opening direction of the tank opening; and a torque mechanism that is interposed between the handle and the casing main body and transmits a rotational torque applied to the handle to the casing main body. The torque mechanism has a handle engagement element that is disposed on the handle; a torque plate that is interposed between the casing main body and the handle and has a plate engagement element, which engages with the handle engagement element; and a main body engagement element that is disposed on the casing main body and transmits a rotational torque from the torque plate to the casing main body. A state of the plate engagement element is changeable between an engagement state, a first non-engaged state, and a second non-engaged state. When the handle is rotated in the closing direction of the tank opening from a state where the casing engagement element is positioned at the opening engagement element, the plate engagement element falls into the engagement state, where the plate engagement element engages with the handle engagement element and the rotational torque applied to the handle is transmitted to the casing main body. When the casing engagement element of the casing main body engages with the opening engagement element and the rotational torque applied to the handle exceeds a predetermined level, the plate engagement element falls into the first non-engaged state, where the plate engagement element is released from the handle engagement element. When the handle is rotated in the opening direction of the tank opening from the state where the casing engagement element engages with the opening engagement element, the plate engagement element falls into the second non-engaged state, where the plate engagement element is released from the handle engagement element with a smaller rotational torque than the rotational torque required in the first non-engaged state.

These and other objects, features, aspects, and advantages of the present invention will become more apparent from the following detailed description of the preferred embodiments with the accompanying drawings.

DESCRIPTION OF CURRENTLY PREFERRED EMBODIMENTS OF THE PRESENT INVENTION

Figure 1:
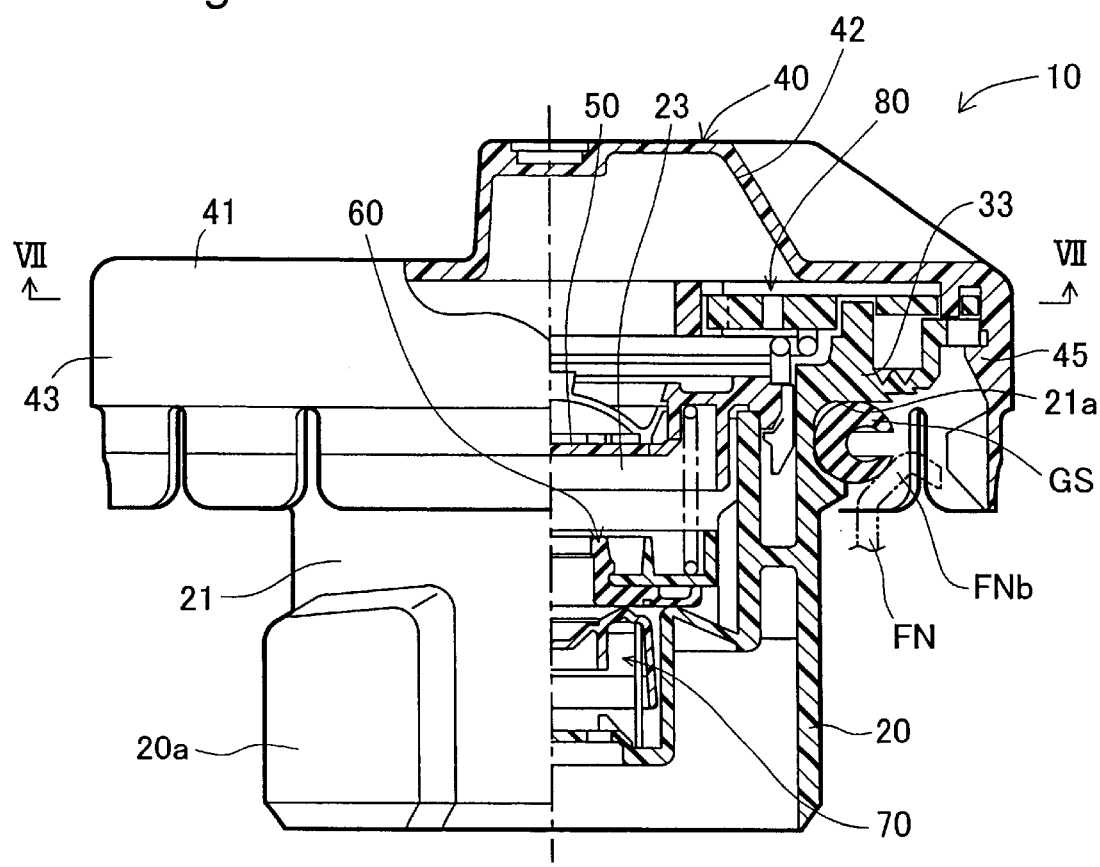
FIG. 1 is a semi-sectional view illustrating a tank cap in a first embodiment according to the present invention.

FIG. 1 is a semi-sectional view illustrating a tank cap 10 in a first embodiment according to the present invention. The tank cap 10 is attached to a filler neck FN having a fuel supply inlet FNb (tank opening), through which a supply of fuel is fed to a fuel tank (not shown). The tank cap 10 includes a casing main body 20 made of a synthetic resin material such as polyacetal, a cover 40 mounted on an upper portion of the casing main body 20, which is made of a synthetic resin material, such as nylon, and works like a handle, an inner cover 50 that closes an upper opening of the casing main body 20 to define a valve chest 23, a positive pressure valve 60, and a negative pressure valve 70 that are accommodated in the valve chest 23 and work as pressure control valves, a torque mechanism 80, and a gasket GS set on an upper circumference of the casing main body 20 to seal the casing main body 20 against the filler neck FN.

Figure 2:
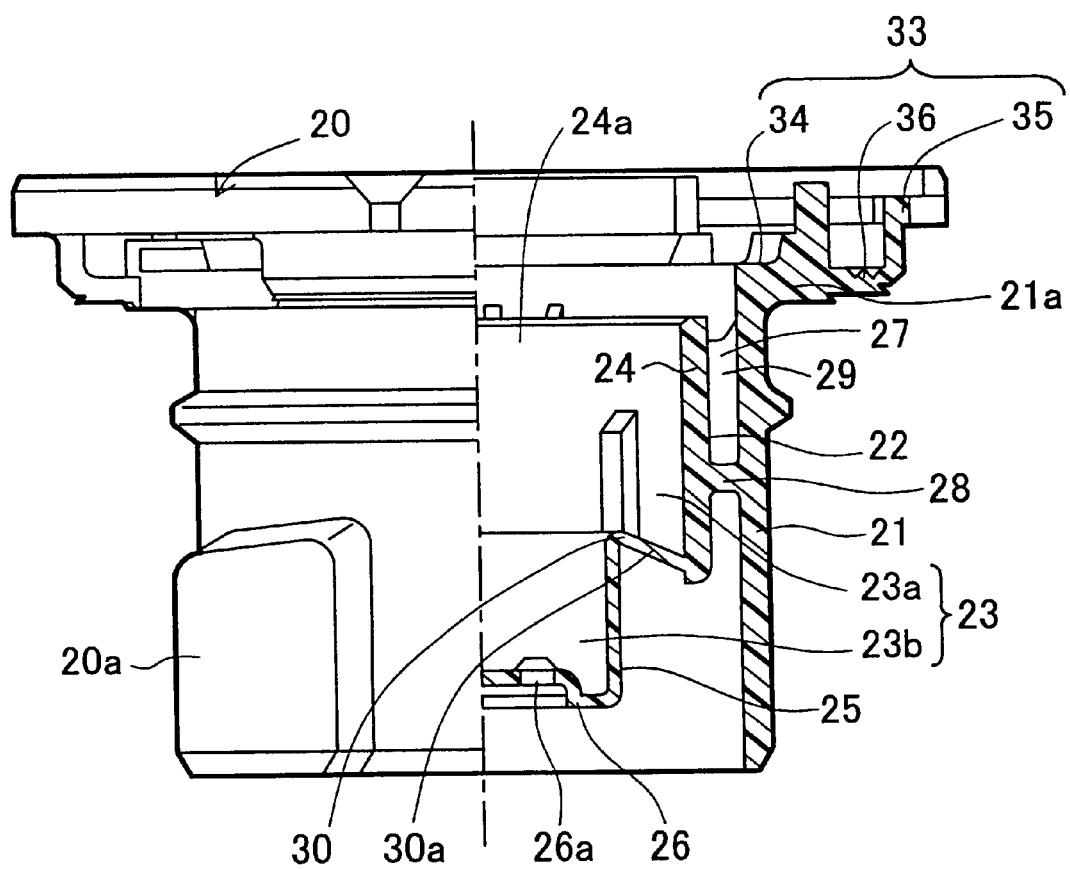
FIG. 2 is a semi-sectional view showing a casing main body included in the tank cap of the first embodiment.
Figure 3:
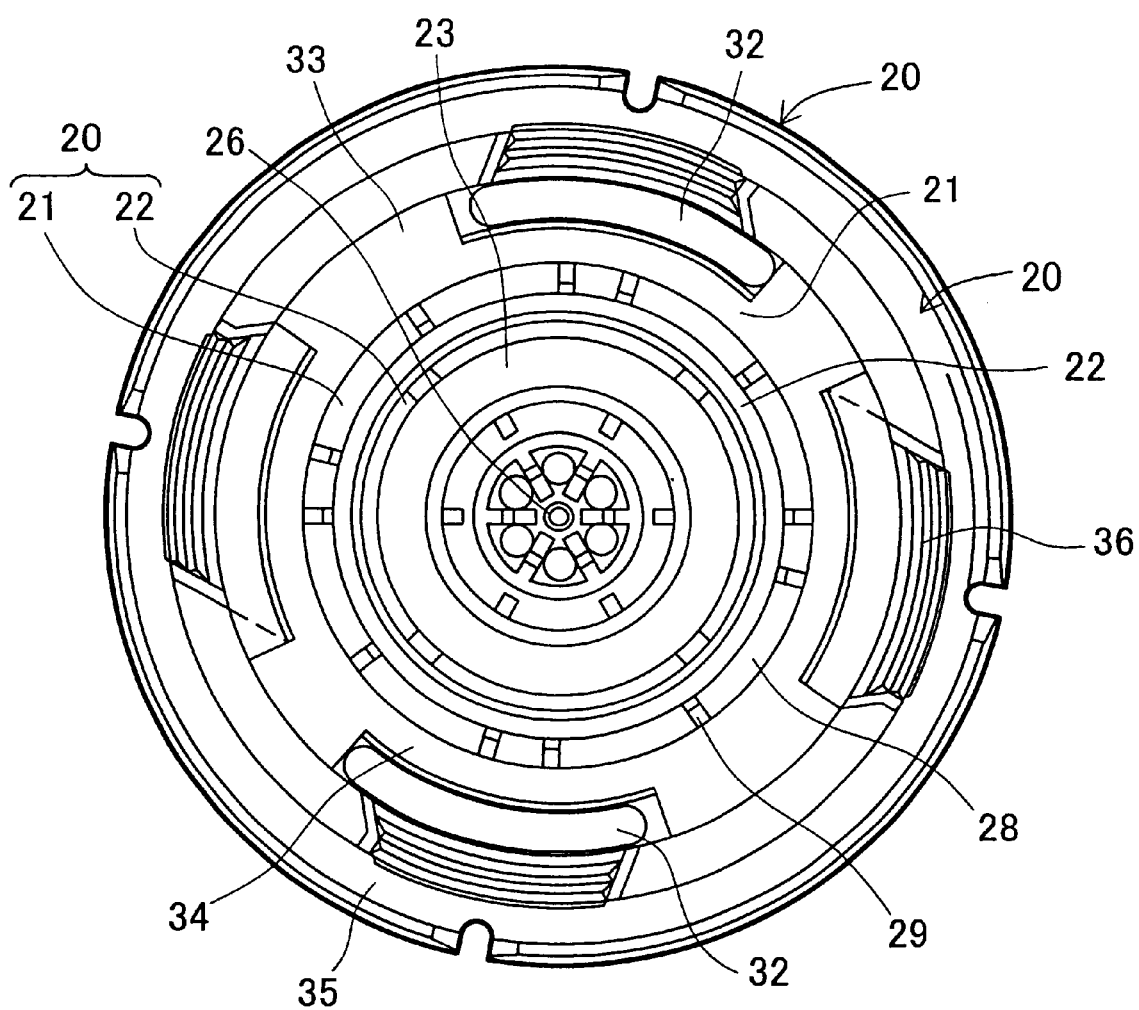
FIG. 3 is a plan view showing the casing main body of the first embodiment.
Figure 4:
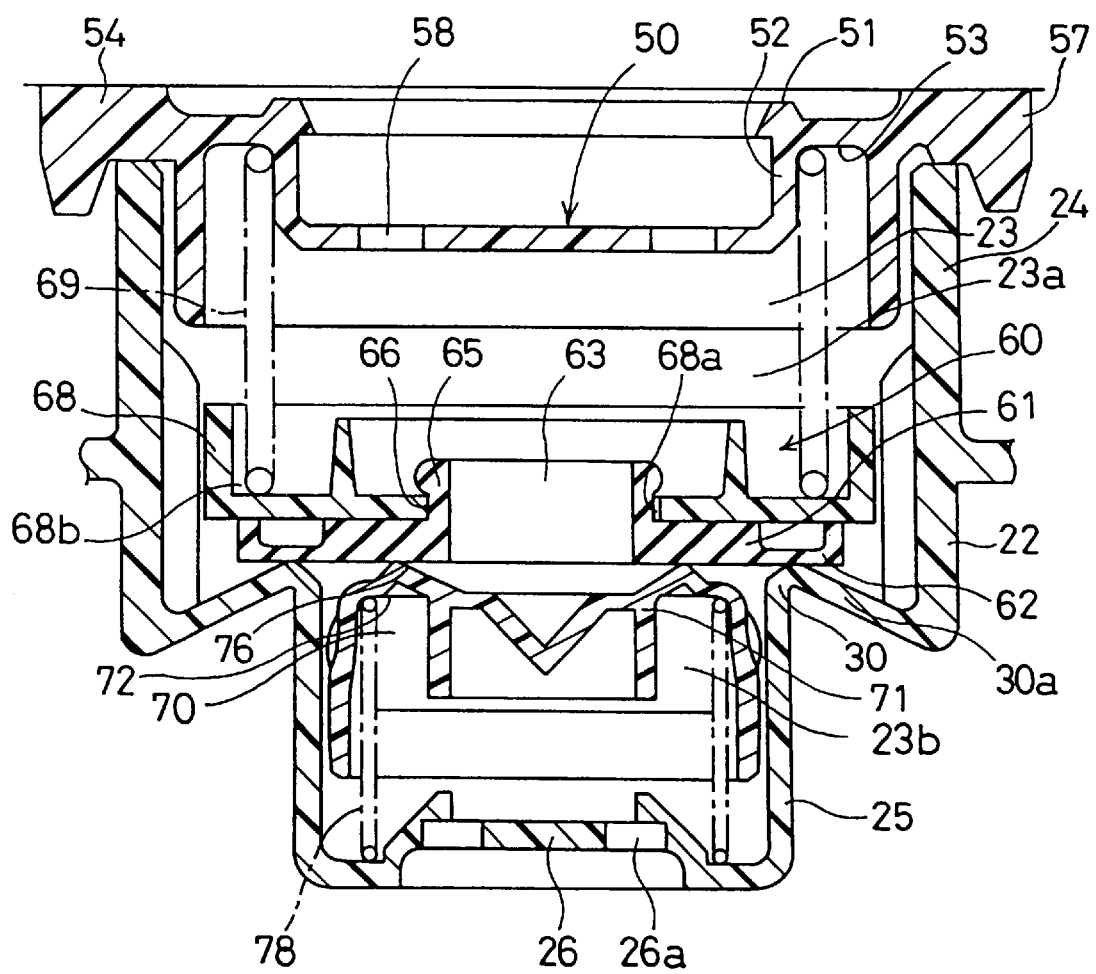
FIG. 4 is a sectional view illustrating a positive pressure valve and a negative pressure valve accommodated in the casing main body.

The elements of the tank cap 10 in this embodiment are described in detail below. FIG. 2 is a semi-sectional view showing the casing main body 20. FIG. 3 is a plan view showing the casing main body 20. FIG. 4 is a sectional view illustrating the positive pressure valve 60 and the negative pressure valve 70 accommodated in the casing main body 20. The casing main body 20 has a substantially cylindrical outer tubular body 21 with a casing engagement element 20a, which engages with an anther engagement element disposed at inner circumference of the filler neck FN, and a valve chest-forming body 22 that is disposed inside the outer tubular body 21. The valve chest-forming body 22 defines the valve chest 23, in which the positive pressure valve 60 and the negative pressure valve 70 are accommodated.

The outer tubular body 21 and the valve chest-forming body 22 are integrally joined with each other via a horizontal joint 28 and vertical joints 29, as shown in FIGS. 2 and 3. The ring-shaped horizontal joint 28 is disposed below the center of the valve chest-forming body 22. The horizontal joint 28 separates the fuel tank from the outside and defines grooves 27 formed in a space between the outer tubular body 21 and the valve chest-forming body 22. There are four vertical joints 29 arranged at an interval around the circumference of the valve chest-forming body 22. The vertical joints 29 are vertical walls that connect the outer tubular body 21 with the valve chest-forming body 22 and are joined with the horizontal joint 28 to define the grooves 27.

The valve chest-forming body 22 includes a larger-diametral upper side wall 24, a smaller-diametral lower side wall 25, and a bottom wall 26 extending from the lower end of the lower side wall 25. These sections 24, 25, 26 are integrally formed to define the valve chest 23. The valve chest 23 has an upper chamber 23a, in which the positive pressure valve 60 is accommodated, and a lower chamber 23b, in which the negative pressure valve 70 is accommodated. The valve chest-forming body 22 has an upper opening 24a, which is closed by the inner cover 50 (FIG. 4). An inclined surface 30a joins the upper side wall 24 with the lower side wall 25. A seat 30 is formed at the inner edge of the inclined surface 30a. A valve disk 61 of the positive pressure valve 60 is seated on and separated from the seat 30.

The inner cover 50 is welded to the upper edge of the upper side wall 24 by ultrasonic welding to cover the opening 24a. Referring to FIG. 4, the inner cover 50 has a center recess 52 on the substantial center of an inner cover body 51 and a cylindrical support 53 formed around the outer circumference of the center recess 52. The cylindrical support 53 can be inserted into the opening 24a of the valve chest-forming body 22. The outer circumference of the inner cover body 51 forms an outer ring 54. Four positioning ribs 57 are arranged at an interval around the outer circumference of the outer ring 54. The positioning ribs 57 protrude downward to fit in the grooves 27 (FIG. 2) formed between the outer tubular body 21 and the valve chest-forming body 22. A flow path hole 58 (FIG. 4) is formed in the inner cover body 51 to connect the valve chest 23 with the outside.

The positive pressure valve 60 and the negative pressure valve 70 are accommodated in the valve chest 23, as shown in FIG. 4. The positive pressure valve 60 includes a valve disk 61 made of a fluororubber and is movable between an open position and a closed position, a valve support member 68, and a coil spring 69. The valve disk 61 has a seat 62 formed on the lower surface thereof, and a fitting element 65 formed on the central portion thereof to define a valve flow path hole 63. A side support recess 66 is formed on the side of the fitting element 65. The fitting element 65 is inserted and fits in a fitting opening 68a of the valve support member 68 so that the valve disk 61 is joined with the valve support member 68. A spring support 68b is formed on the upper surface of the valve support member 68 in order to support one end of the coil spring 69. The other end of the coil spring 69 is held by the cylindrical support 53 of the inner cover 50. Namely, the coil spring 69 is held between the inner cover 50 and the valve support member 68.

The positive pressure valve 60 of the above configuration regulates the pressure in the fuel tank. When the tank cap 10 is attached to the filler neck FN when the pressure in the fuel tank exceeds a predetermined level, the valve disk 61 and the valve support member 68 of the positive pressure valve 60 rise against the pressing force of the coil spring 69 to the open position. This makes the inside of the fuel tank communicate with the outside via the valve chest 23. When the pressure in the fuel tank decreases at or below the predetermined level in this state, on the other hand, the pressing force of the coil spring 69 lowers the valve disk 61 to the closed position. In this manner, the valve disk 61 is moved between the open position and the closed position in order to cause a differential pressure applied to the valve disk 61 to be not greater than a predetermined value.

The negative pressure valve 70 includes a valve disk 71 made of a resin that is moved between an open position and a closed position, and a coil spring 78 that spans between a spring support step 72 of the valve disk 71 and the bottom wall 26 of the valve chest-forming body 22 to press the valve disk 71. A seat 76, which is formed on the upper portion of the valve disk 71, is movable to be seated on and separated from the valve disk 61 of the positive pressure valve 60.

The negative pressure valve 70 of the above configuration also regulates the pressure in the fuel tank. When the fuel tank has a negative pressure relative to the atmospheric pressure and the differential pressure applied to the valve disk 71 of the negative pressure valve 70 becomes greater than a predetermined value, the valve disk 71 moves down against the pressing force of the coil spring 78 to the open position and is thereby separated from the seat 62 of the valve disk 61 of the positive pressure valve 60. At this moment, the valve disk 61 is seated on the seat 30 of the valve chest-forming body 22. As the valve disk 61 holds the opening position, a passage is formed between the valve disk 71 and the valve disk 61. This makes the inside of the fuel tank communicate with the outside via a passage between the valve disk 71 and the lower side wall 25 of the valve chest-forming body 22 and a connection hole 26a of the bottom wall 26 of the valve chest-forming body 22 to eliminate the negative pressure in the fuel tank. When the differential pressure applied to the valve disk 71 becomes less than the pressing force of the coil spring 78, the valve disk 71 moves up to the closed position.

As described above, when the pressure in the fuel tank increases to make the differential pressure applied to the valve disk 61 of the positive pressure valve 60 exceed the predetermined value, the valve disk 61 moves up against the pressing force of the coil spring 69 to the open position. This sets the positive pressure valve 60 in the open position. When the pressure in the fuel tank decreases to make the differential pressure applied to the valve disk 71 of the negative pressure valve 70 exceed the predetermined value, on the other hand, the valve disk 71 moves down against the pressing force of the coil spring 78 to the open position. This sets the negative pressure valve 70 in the open position. When the positive pressure or the negative pressure in the fuel tank relative to the atmospheric pressure exceeds the predetermined value, the positive pressure valve 60 or the negative pressure valve 70 opens to regulate the pressure in the fuel tank to be within a preset range relative to the atmospheric pressure.

Figure 5:
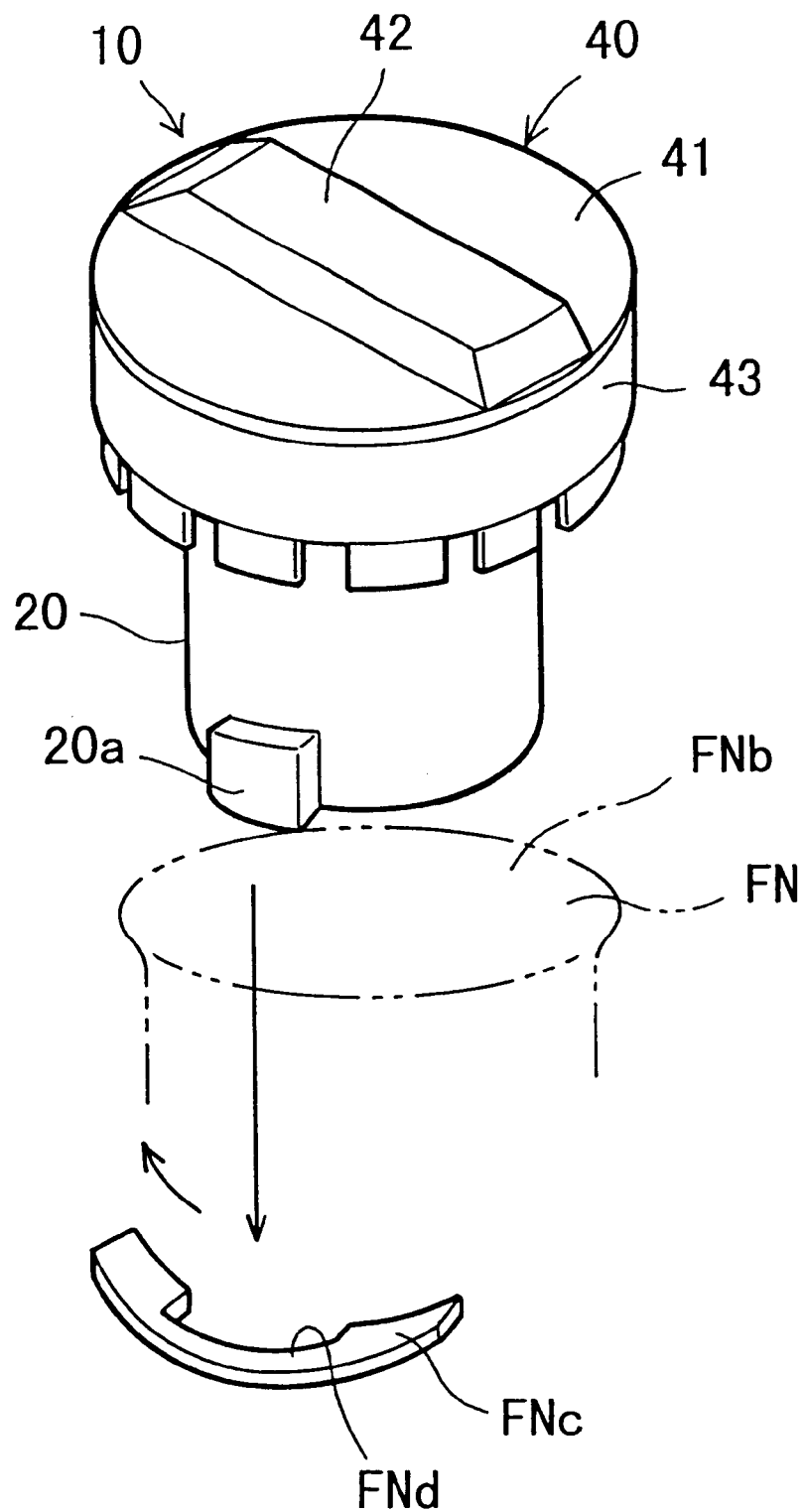
FIG. 5 shows a casing engagement element of the casing main body that engages with a filler neck FN.

Referring back to FIG. 1, the gasket GS is mounted on the lower surface of a flange 33 formed in the upper portion of the casing main body 20. The gasket GS is interposed between a seal support 21a of the flange 33 and the fuel supply inlet FNb of the filler neck FN. When the tank cap 10 is fit into the fuel supply inlet FNb, the gasket GS is pressed against the seal support 21a to exert the sealing effect. The casing engagement element 20a is formed in the lower portion on the outer circumference of the outer tubular body 21. FIG. 5 shows the casing engagement element 20a of the casing main body 20 that engages with the filler neck FN. An opening engagement element FNc is formed on the inner circumference of the filler neck FN. A neck insertion notch FNd is formed in a part of the inner circumferential portion of the opening engagement element FNc in order to receive the casing engagement element 20a of the tank cap 10, which is axially inserted into the fuel supply inlet FNb of the filler neck FN. The attachment procedure positions the casing engagement element 20a at the neck insertion notch FNd, inserts the tank cap 10 into the fuel supply inlet FNb of the filler neck FN, and rotates the tank cap 10 by a predetermined angle, for example, by approximately 90 degrees. This causes the casing engagement element 20a to engage with the opening engagement element FNc, thereby attaching the tank cap 10 to the filler neck FN.

Figure 6:
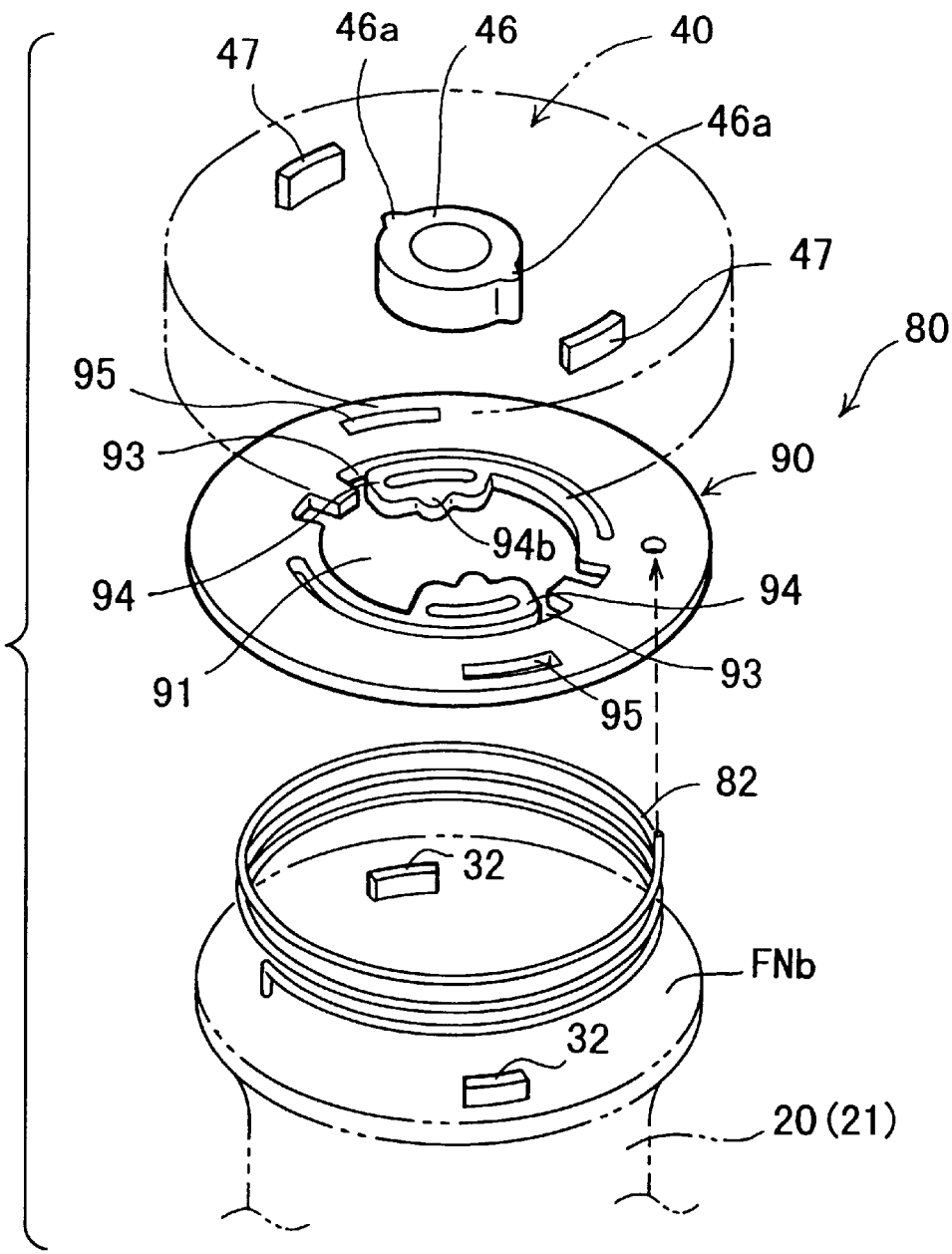
FIG. 6 is a decomposed perspective view illustrating a cover and a torque mechanism disposed in the upper portion of the casing main body.
Figure 7:
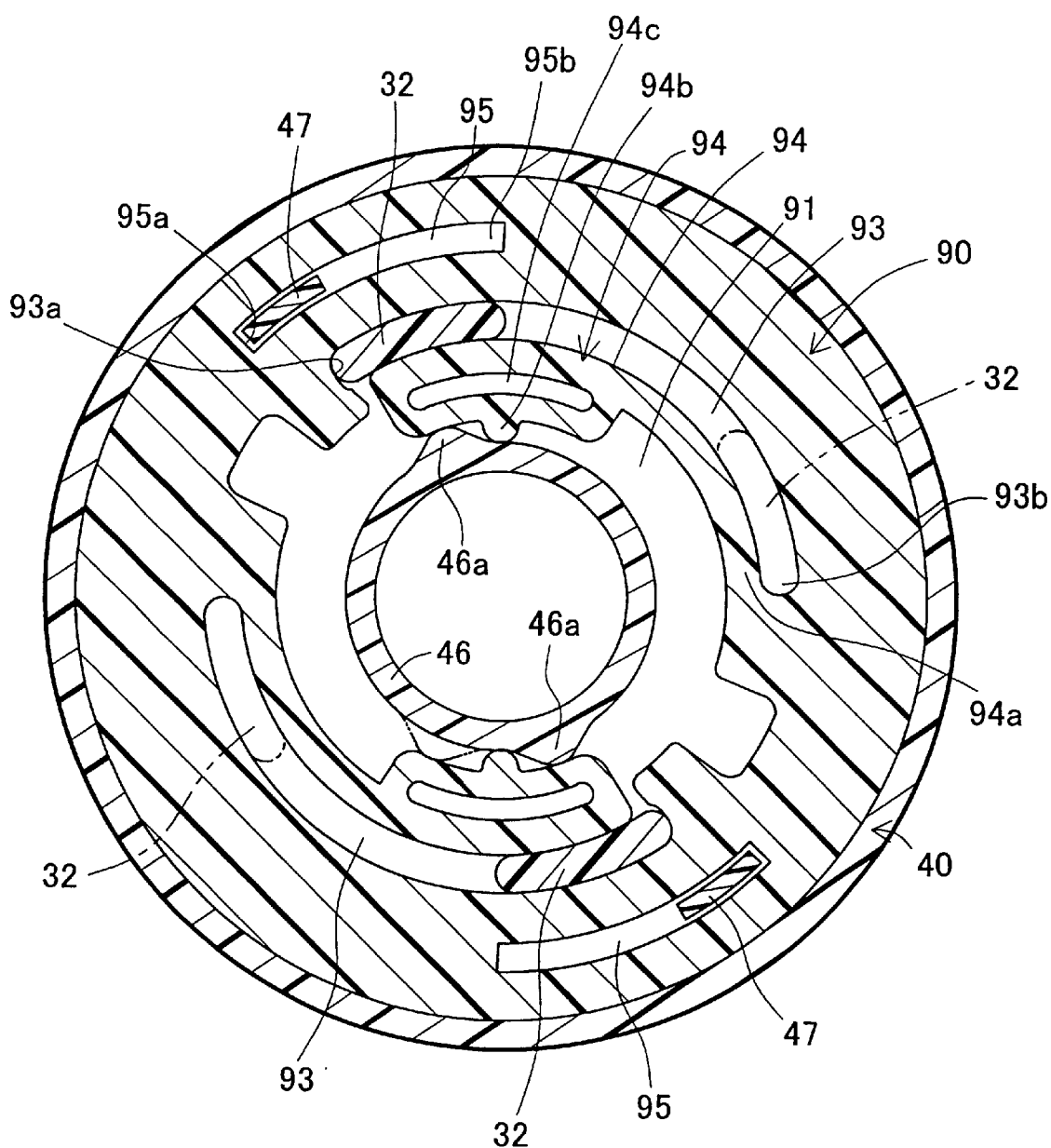
FIG. 7 is a sectional view illustrating the torque mechanism, taken on the line VII—VII in FIG. 1.

FIG. 6 is a decomposed perspective view illustrating the cover 40 and the torque mechanism 80 disposed in the upper portion of the casing main body 20. FIG. 7 is a sectional view illustrating the torque mechanism 80, taken on the line VII—VII in FIG. 1. The torque mechanism 80 gives the user a feeling of attachment by an audible click when the rotational torque of a predetermined level or more is applied to the cover 40 when closing the fuel supply inlet FNb with the tank cap 10. The user can thus confirm that the tank cap 10 is attached to the filler neck FN with the rotational torque of the predetermined level or more.

Referring back to FIG. 1, the cover 40 is detachably attached to the flange 33 of the casing main body 20 in a rotatable manner. As shown in FIG. 2, the flange 33 of the casing main body 20 has an inner ring 34 disposed on the outer tubular body 21, an outer ring 35 disposed outside and protruding above the inner ring 34, and four joints 36 arranged around the circumference of the flange 33 to join the inner ring 34 with the outer ring 35 (FIG. 3). The cover 40 shown in FIGS. 1 and 5 includes a disc plate 41, a handle 42 that protrudes upward from the disc plate 41, and a side wall 43 integrally formed around the disc plate 41. The respective sections 41, 42, 43 of the cover 40 are made of a conductive resin and are integrally formed by injection molding. Eight engagement projections 45 are formed at an interval around the inner circumference of the side wall 43.

The engagement projections 45 engage with the outer ring 35 of the flange 33 (FIG. 2), so that the cover 40 is joined with the casing main body 20.

Referring to FIGS. 6 and 7, the torque mechanism 80 includes a pair of main body ribs 32,32 that protrude upward from the upper surface of the outer tubular body 21 of the casing main body 20, a cylindrical shaft 46, a pair of cover engagement projections 46a,46a (handle engagement elements) formed on the surface of the cylindrical 46, a pair of cover trigger projections 47,47 formed on the lower surface of the cover 40, a spring 82, and a torque plate 90. The cylindrical shaft 46 protrudes from the center of the lower surface of the cover 40. The pair of cover engagement projections 46a,46a project from the outer circumferential surface of the cylindrical shaft 46. The pair of arc-shaped cover trigger projections 47,47 protrude from the lower surface of the cover 40. The pair of cover engagement projections 46a,46a and the pair of cover trigger projections 47,47 are arranged symmetrically around the rotational shaft of the cover 40.

The spring 82 is a coil spring interposed between the casing main body 20 and the torque plate 90. The spring 82 spans between the upper portion of the casing main body 20 and the outer circumferential portion of the torque plate 90 and accumulates the pressing force therein when the torque plate 90 is rotated counterclockwise relative to the casing main body 20.

Referring to FIG. 7, the torque plate 90 is a thin disk plate made of a resin, and has a through-hole and guide slots. The torque plate 90 has a center aperture 91 formed on the center thereof, a pair of rib guides 93,93 arranged concentrically with the center aperture 91, and a pair of trigger guide slots 95,95 arranged outside the rib guides 93,93 and concentrically with the center aperture 91. The cylindrical shaft 46 of the cover 40 passes through the center aperture 91. A pair of elastic torque pieces 94,94 are formed around the circumference of the center aperture 91. Each elastic torque piece 94,94 is a cantilever arc piece that extends from a support end 94a, and has a plate engagement element 94b that protrudes toward the center of the aperture 91 and a slot 94c formed on the outer circumferential side of the plate engagement element 94b. The elastic torque piece 94 is elastically deformed to narrow the slot 94c, when the plate engagement element 94b is pressed against the cover engagement projection 46a of the cover 40 (see FIG. 9).

The pair of main body ribs 32,32 fit in the pair of rib guides 93,93 arranged outside the pair of elastic torque pieces 94,94. Each of the main body ribs 32,32 moves forwards and backwards along the rib guides 93,93 between a first end 93a and a second end 93b of the rib guide 93. The pair of cover trigger projections 47,47 fit in the pair of trigger guide slots 95,95. Each of the cover trigger projections 47,47 moves forwards and backwards along the trigger guide slot 95 between a first end 95a and a second end 95b of the trigger guide slot 95.

The following describes operation of the torque mechanism 80 in the process of opening and closing the fuel supply inlet FNb of the filler neck FN with the tank cap 10. The torque mechanism 80 has pairs of elements symmetrically arranged around the rotational axis of the cover 40, although the following description generally refers to only one of each pair of elements.

Figure 8:
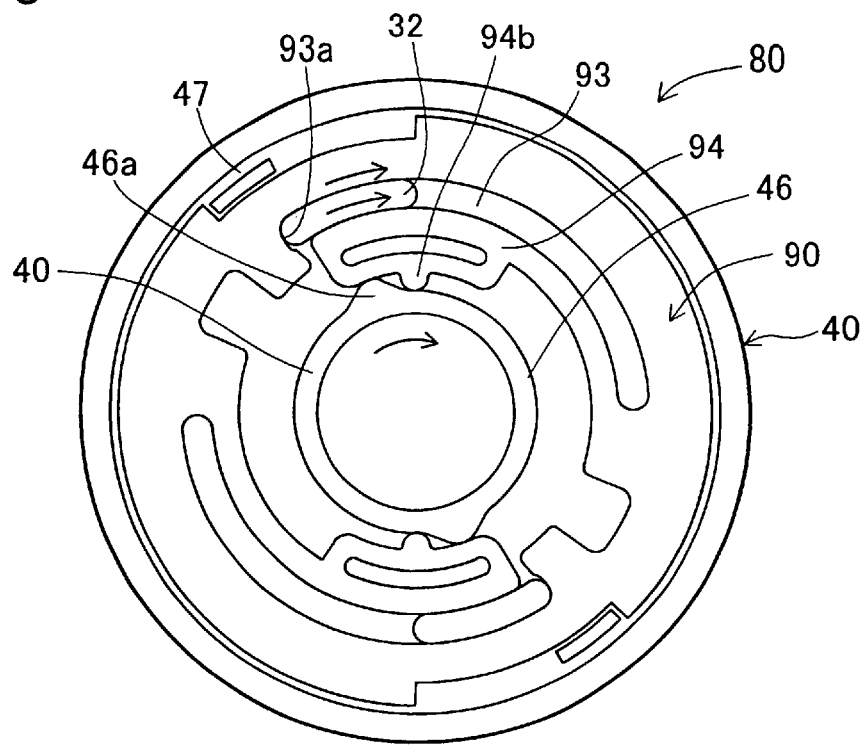
FIG. 8 shows an initial state in a series of operations of the torque mechanism in the first embodiment.

The user may hold the handle 42 of the cover 40 (FIG. 5) with a thumb and an index finger, position the casing engagement element 20a formed on the casing main body 20 at the neck insertion notch FNd of the filler neck FN, and insert the casing main body 20 in the axial direction into the open fuel supply inlet FNb of the filler neck FN. When the handle 42 of the cover 140 is located in the vertical direction, the handle 42 of the cover 40 is designed to make the casing engagement element 20a readily fit in the neck insertion notch FNd and facilitate the attachment of the tank cap 10 to the filler neck FN. As shown in FIG. 8, in the torque mechanism 80, the pressing force of the spring 82 causes the main body rib 32 to press against the first end 93a of the rib guide 93 and causes the cover engagement projection 46a of the cover 40 to contact the plate engagement element 94b of the torque plate 90.

Figure 9:
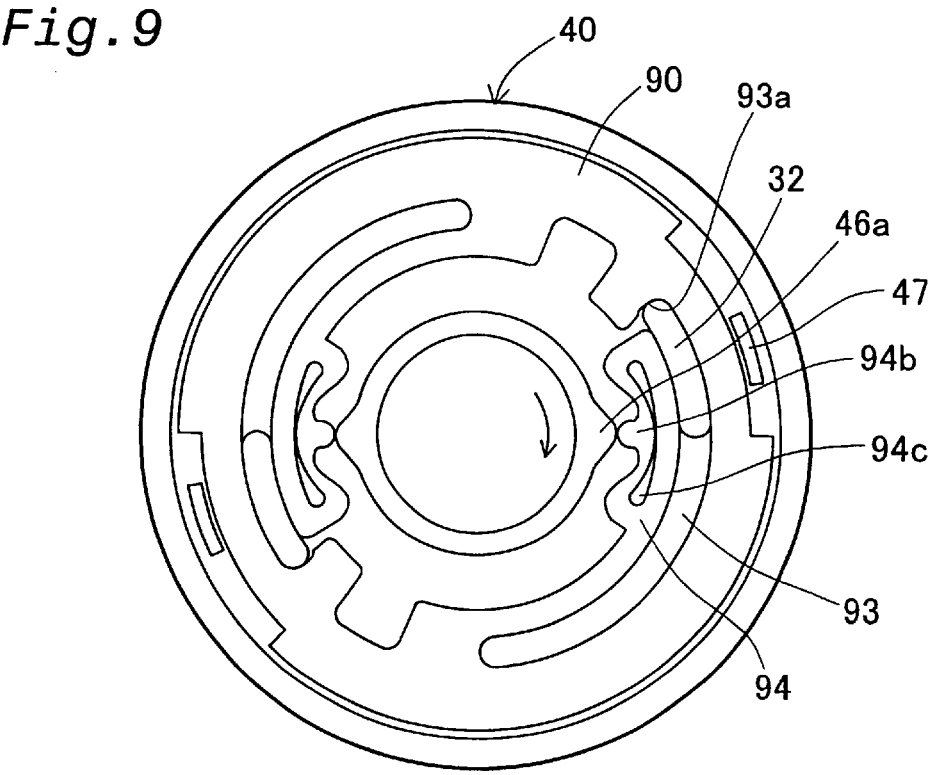
FIG. 9 shows a state subsequent to the state of FIG. 8 in the series of operations of the torque mechanism of the first embodiment.
Figure 10:
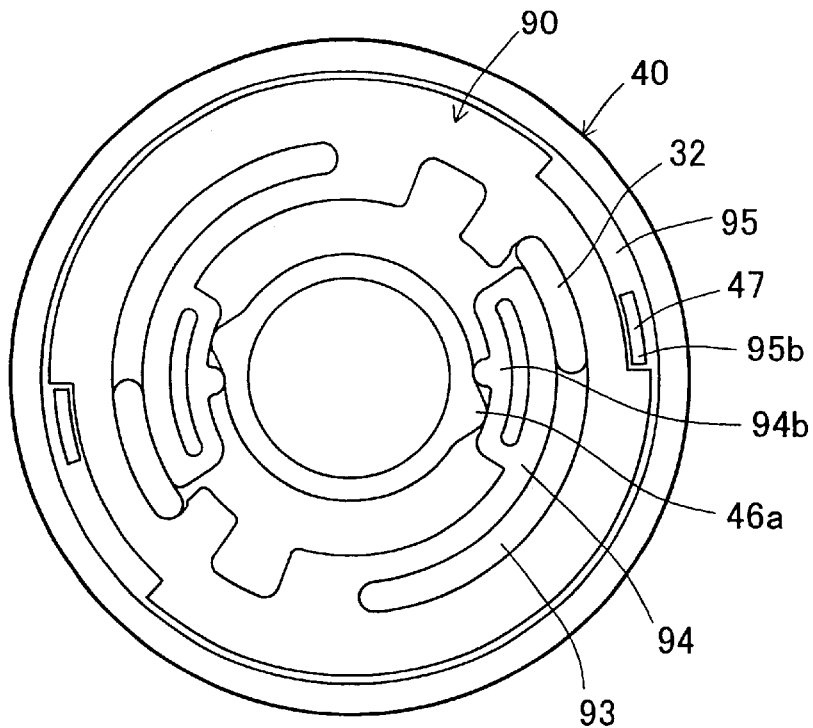
FIG. 10 shows a state subsequent to the state of FIG. 9 in the series of operations of the torque mechanism of the first embodiment.

A clockwise rotational force is applied to the cover 40 in the above state to close the fuel supply inlet FNb of the filler neck FN with the tank cap 10. The torque mechanism 80 carries out a series of processes, as shown in FIGS. 8 through 10. The clockwise rotational force applied to the cover 40 is transmitted to the torque plate 90 through the engagement of the cover engagement projection 46a of the cover 40 with the plate engagement element 94b of the torque plate 90 to rotate the torque plate 90 clockwise. The clockwise rotation of the torque plate 90 presses the main body rib 32 of the casing main body 20 against the first end 93a of the rib guide 93 formed in the torque plate 90. This causes the cover 40, the torque plate 90, and the casing main body 20 to rotate integrally in the closing direction of the fuel supply inlet FNb. Accordingly, the force of engaging the casing engagement element 20a of the casing main body 20 with the opening engagement element FNc of the filler neck FN is enhanced. When a reaction force generated by the engagement force becomes equal to or greater than a predetermined rotational torque, the cover engagement projection 46a rides over the plate engagement element 94b as shown in FIG. 9 to a first non-engaged state shown in FIG. 10. This process to the first non-engaged state gives the user a feeling of attachment through an audible click. The fuel supply inlet FNb of the filler neck FN is accordingly closed with the tank cap 10 under a predetermined clamping torque.

Figure 11:
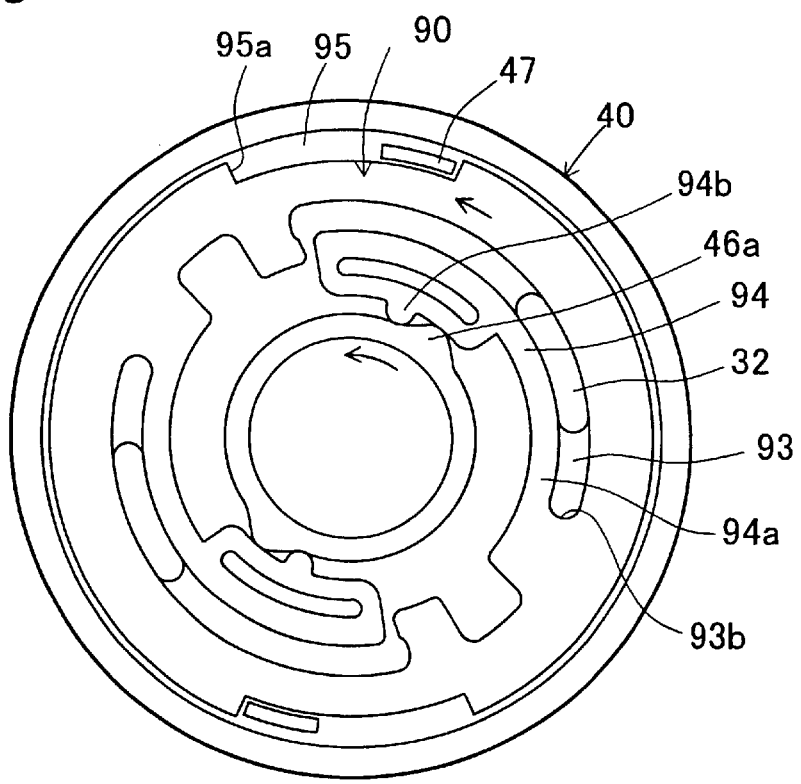
FIG. 11 shows a state subsequent to the state of FIG. 10 in the series of operations of the torque mechanism of the first embodiment.

In order to release the tank cap 10 and open the fuel supply inlet FNb of the filler neck FN, on the other hand, the user holds the handle 42 of the cover 40 with the thumb and the index finger and applies a counterclockwise rotational force to the cover 40, as shown in FIG. 11. The counterclockwise rotational force applied to the cover 40 causes the cover engagement projection 46a of the cover 40 to press against the plate engagement element 94b of the torque plate 90. Since the casing main body 20 is attached to the filler neck FN, only the cover 40 and the torque plate 90 are rotated counterclockwise against the pressing force of the spring 82. With the counterclockwise rotation of the cover 40 and the torque plate 90, the main body rib 32 moves along the rib guide 93 towards the second end 93b thereof.

Figure 12:
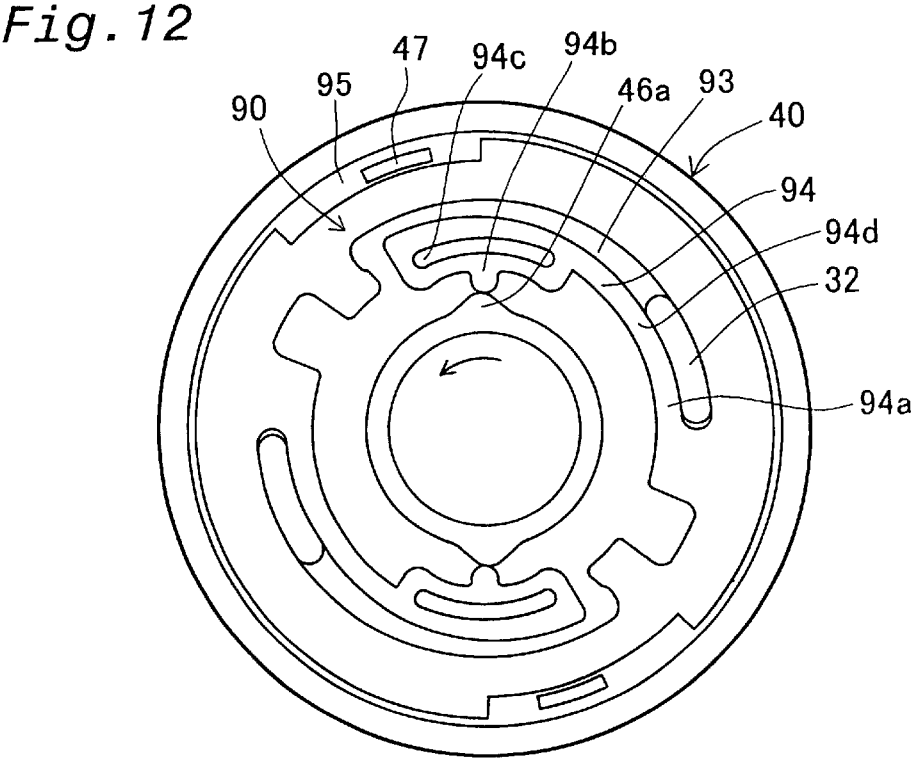
FIG. 12 shows a state subsequent to the state of FIG. 11 in the series of operations of the torque mechanism of the first embodiment.
Figure 13:
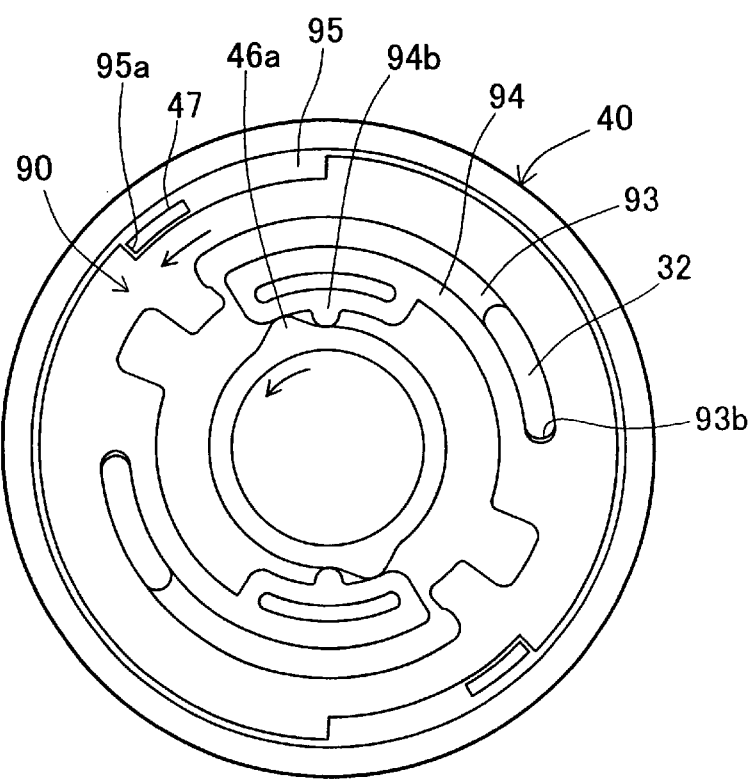
FIG. 13 shows a state subsequent to the state of FIG. 12 in the series of operations of the torque mechanism of the first embodiment.

The elastic torque piece 94 is easily deflected when the main body rib 32 is not positioned on the free end of the elastic torque piece 94, as shown in FIG. 11. A further counterclockwise rotation of the cover 40, as shown in FIG. 12, causes the cover engagement projection 46a to press against the plate engagement element 94b and elastically deform the elastic torque piece 94. The elastic deformation of the elastic torque piece 94 significantly deflects a part 94d that contacts the main body rib 32 and varies the width of the slot 94c. This causes the cover engagement projection 46a to ride over the plate engagement element 94b with a smaller pressing force and results in a second non-engaged state, as shown in FIG. 13. Namely, the cover engagement projection 46a rides over the plate engagement element 94b under a smaller rotational torque than the rotational torque required in the closing process of the tank cap 10 discussed above.

A counterclockwise rotation of the cover 40 to the position where the cover engagement projection 46a rides over the plate engagement element 94b causes the cover trigger projection 47 to press against an end 95a of the torque plate 90. In this state, the main body rib 32 presses against the second end 93b of the rib guide 93. The rotational force applied to the cover 40 is accordingly transmitted to the casing main body 20 via the cover trigger projection 47, the torque plate 90, the second end 93b of the rib guide 93, and the main body rib 32. This causes the cover 40, the torque plate 90, and the casing main body 20 to rotate counterclockwise integrally.

Figure 14:
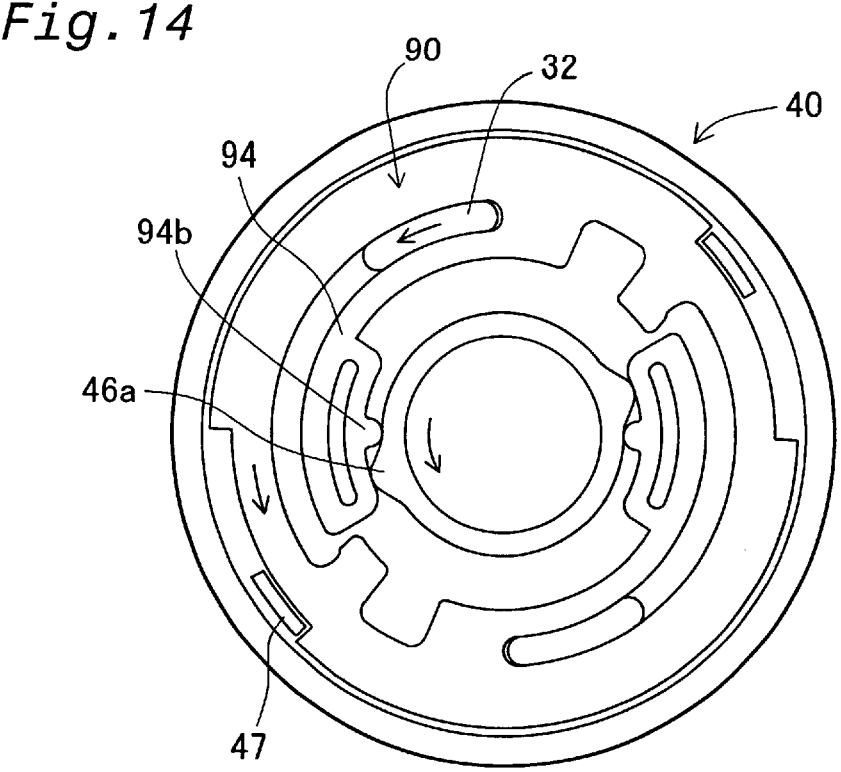
FIG. 14 shows a state subsequent to the state of FIG. 13 in the series of operations of the torque mechanism of the first embodiment.
Figure 15:
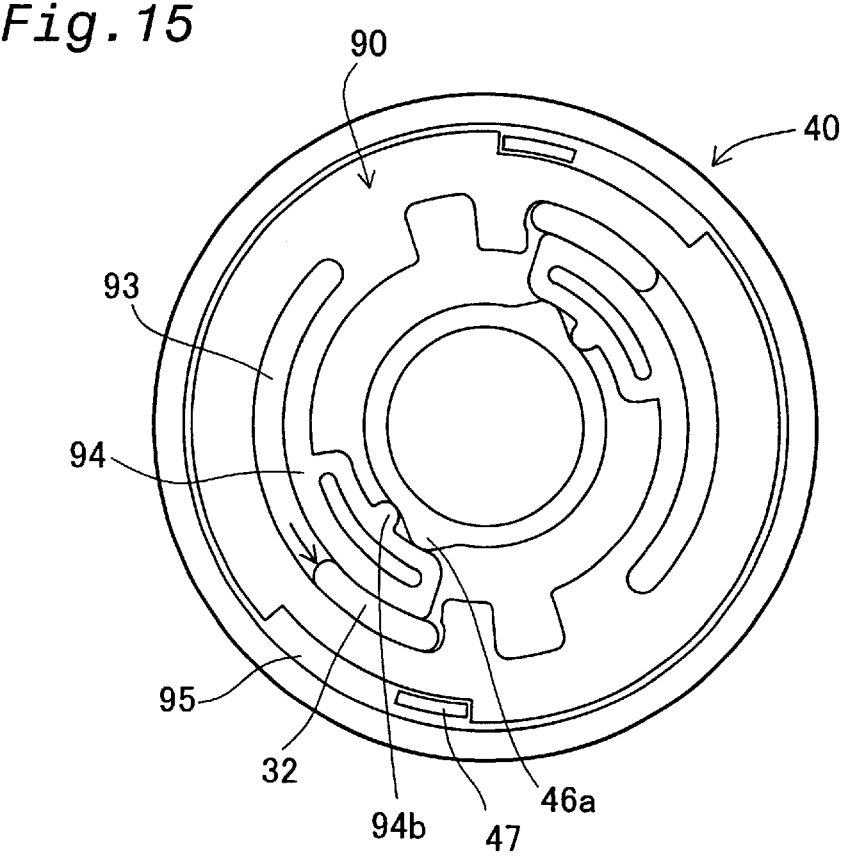
FIG. 15 shows a state subsequent to the state of FIG. 14 in the series of operations of the torque mechanism of the first embodiment.

The rotation of the casing main body 20 integrally with the cover 40 by approximately 90 degrees (the state of FIG. 14) causes the casing engagement element 20a to be released from the opening engagement element FNc of the filler neck FN. The casing main body 20 is accordingly released from the restraint force to the filler neck FN. As the casing main body 20 receives the pressing force of the spring 82 and the cover 40 is held between the thumb and a finger of the user, the casing main body 20 rotates counterclockwise relative to the cover 40 and the torque plate 90 and returns to the initial position (the state of FIG. 15). Here, the positional relationship between the handle 42 of the cover 40 and the casing engagement element 20a of the casing main body 20 returns to the initial state.

The user has a feeling of attachment through an audible click when the cover engagement projection 46a rides over the plate engagement element 94b in the process of closing the tank cap 10. This assures the user that the tank cap 10 is clamped under a predetermined torque. Namely, the tank cap 10 is clamped under a fixed torque, irrespective of the elasticity of the gasket GS.

Since the engagement of the casing engagement element 20a with the opening engagement element FNc requires rotation of the tank cap 10 only approximately 90 degrees, a plurality of rotating actions by a user is not required to attach of the tank cap 10 to the filler neck FN.

In the torque mechanism 80 of the embodiment, when a counterclockwise rotational torque is applied to the cover 40 to open the tank cap 10, the plate engagement element 94b and the cover engagement projection 46a fall into the second non-engaged state, which requires a smaller rotational torque than the first on-engaged state. This does not interfere with the accumulation of the pressing force in the spring 82. The accumulated pressing force enables the positional relationship between the cover 40 and the casing main body 20 to return to the initial state.

Since this arrangement facilitates the positioning of the handle 42 of the cover 40 and the casing engagement element 20a of the casing main body 20 in the process of closing the tank cap 10, the fuel supply inlet FNb of the filler neck FN is readily closed with the tank cap 10.

The engagement and the release of the cover 40 with and from the torque plate 90 in the torque mechanism 80 are attained simply by a variation in engagement force due to the elastic deformation of the elastic torque pieces 94.

Figure 16:
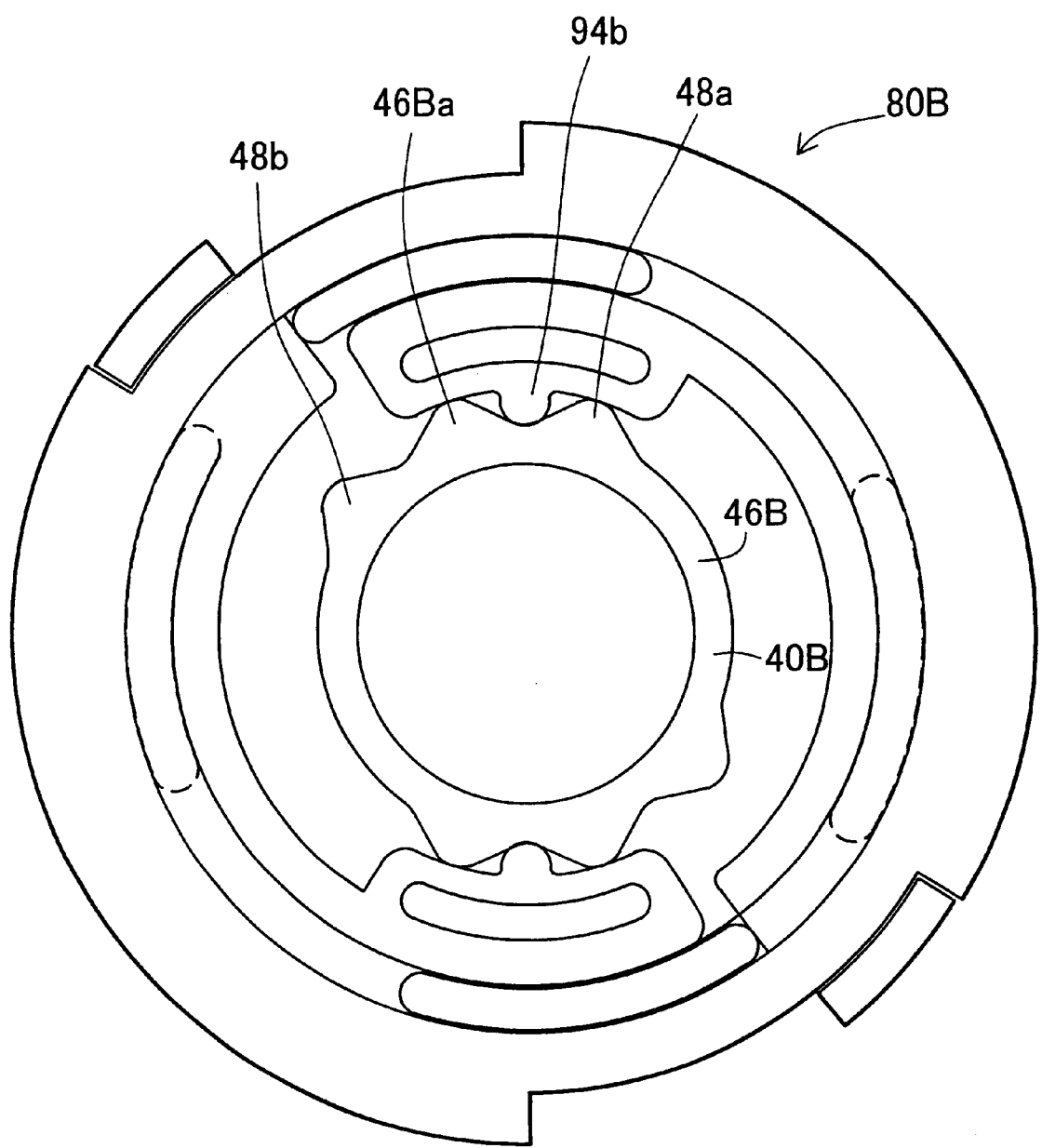
FIG. 16 shows another torque mechanism as a modification of the first embodiment.

FIG. 16 shows another torque mechanism 80B as one modification of the first embodiment. In the torque mechanism 80B of FIG. 16, a pair of cover engagement projections 46Ba,46Ba and stoppers 48a and 48b are formed around a cylindrical shaft 46B of a cover 40B. The stoppers 48a and 48b are disposed on respective sides of each cover engagement projection 46Ba. The plate engagement element 94b is positioned either between the cover engagement projection 46Ba and the stopper 48a or between the cover engagement projection 46Ba and the stopper 48b. In this arrangement, in the state where the fuel supply inlet of the filler neck is closed with the tank cap or is open, the plate engagement element 94b is positioned either between the cover engagement projection 46Ba and the stopper 48a or between the cover engagement projection 46Ba and the stopper 48b. This arrangement effectively prevents the cover 40B from rattling around the circumference of the torque plate.

Figure 17:
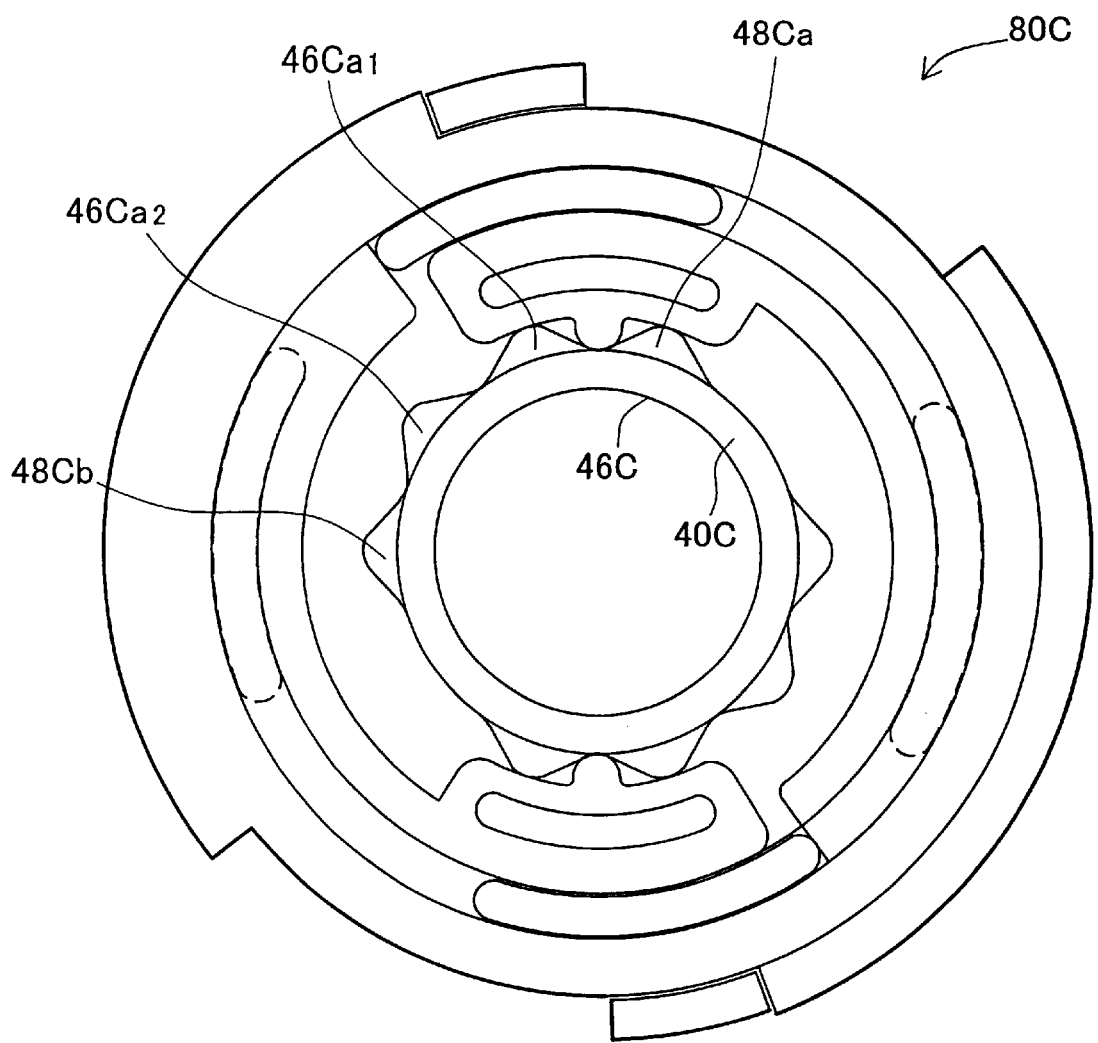
FIG. 17 shows still another torque mechanism as another modification of the first embodiment.
Figure 18:
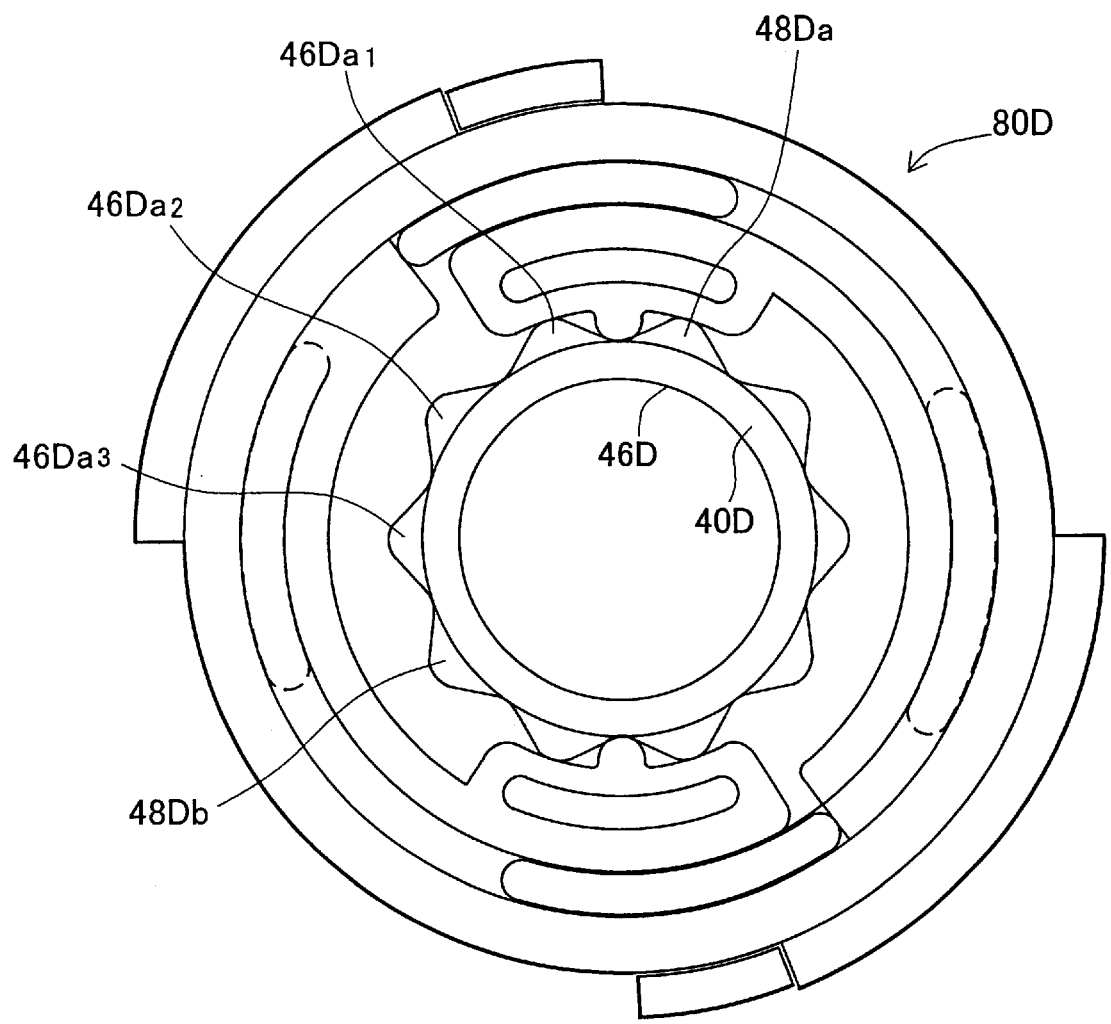
FIG. 18 shows another torque mechanism as still another modification of the first embodiment.

FIGS. 17 and 18 show other torque mechanisms 80C and 80D as other modifications of the first embodiment. In the torque mechanism 80C of FIG. 17, two pairs of cover engagement projections 46Ca1,46Ca1 and 46Ca2,46Ca2 are formed around a cylindrical shaft 46C of a cover 40C. Stoppers 48Ca and 48Cb are disposed across each set of the cover engagement projections 46Ca1 and 46Ca2. In the torque mechanism 80D of FIG. 18, three pairs of cover engagement projections 46Da1,46Da1, 46Da2,46Da2, and 46Da3,46Da3 are formed around a cylindrical shaft 46D of a cover 40D. Stoppers 48Da, 48Db are disposed across each set of the cover engagement projections 46Da1, 46Da2, 46Da3. The multiple pairs of cover engagement projections give the user the feeling of attachment through audible clicks and enable regulation of the sealing force of the gasket.

Figure 19:
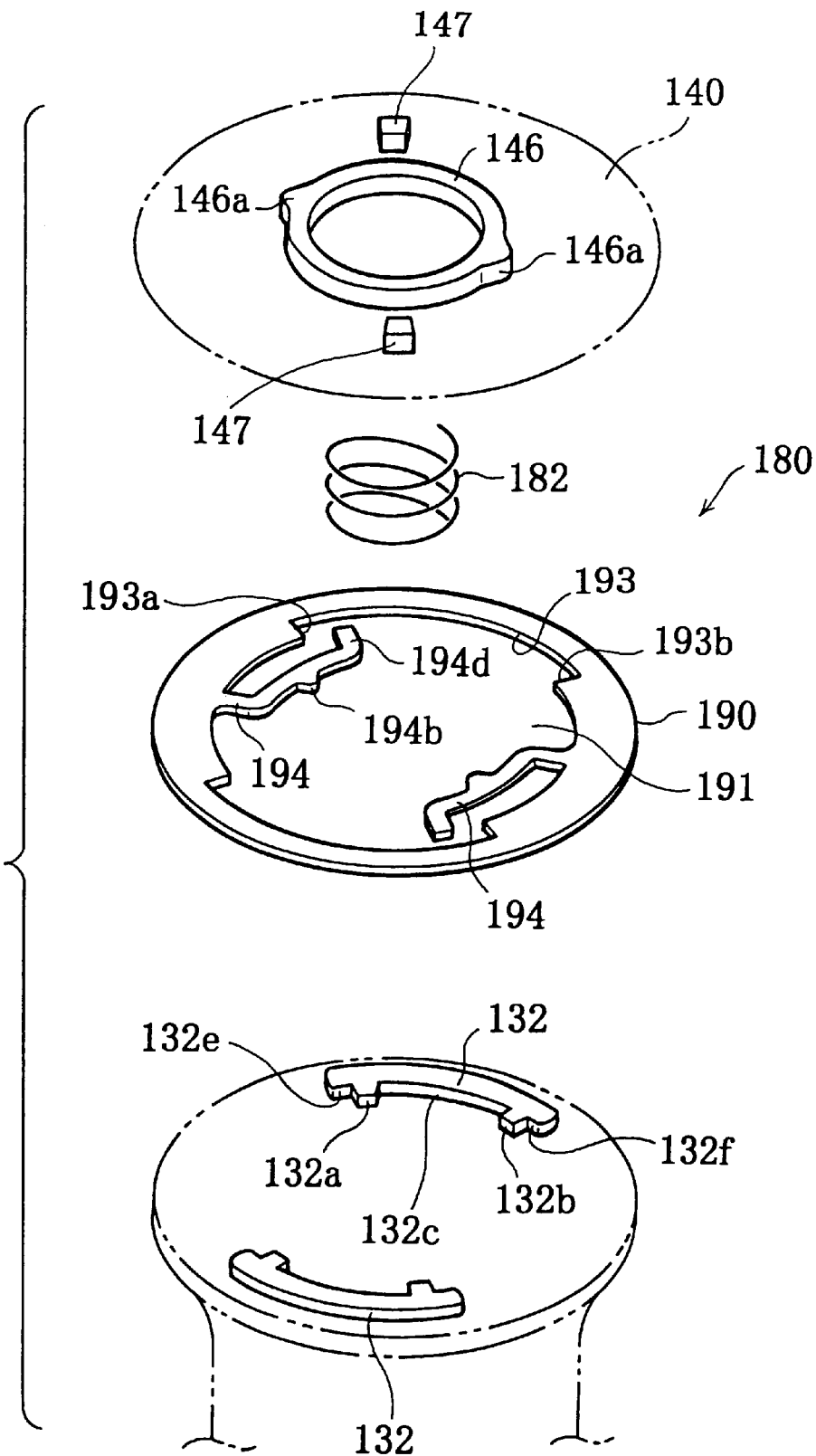
FIG. 19 is a decomposed perspective view illustrating a torque mechanism according to a second embodiment of the present invention.
Figure 20:
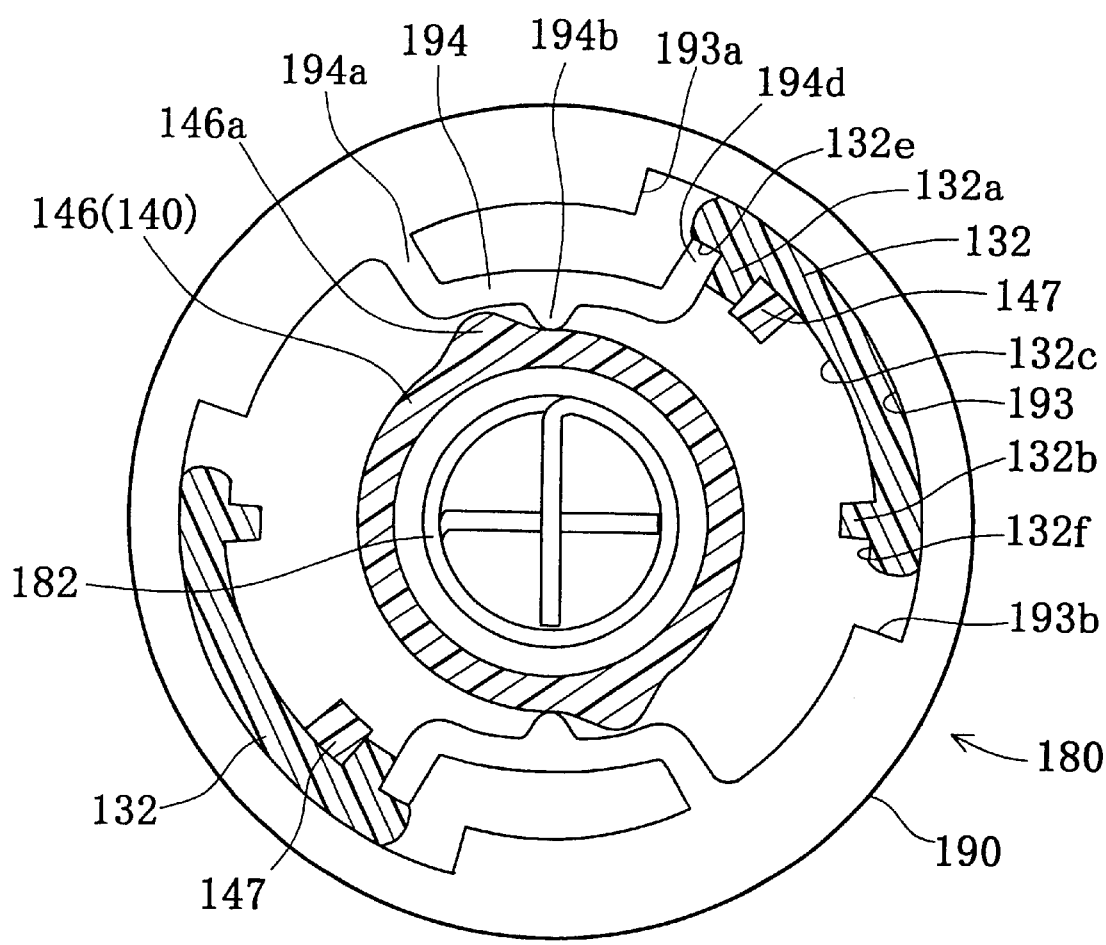
FIG. 20 is a sectional view illustrating the torque mechanism of the second embodiment.

FIG. 19 is a decomposed perspective view illustrating a torque mechanism 180 in a second embodiment according to the present invention. FIG. 20 is a sectional view illustrating the torque mechanism 180. In comparison to the first embodiment, the torque mechanism 180 of the second embodiment has a different shape of elastic torque pieces 194, and different shape and layout of main body ribs 132, cover trigger projections 147, and spring 182. Like the torque mechanism 80 of the first embodiment discussed above, the various elements of the torque mechanism 180 of the second embodiment, such as the elastic torque pieces 194, are arranged in pairs symmetrically around the rotational axis of the cover 140, although the following description generally refers to only one of the paired elements.

Referring to FIGS. 19 and 20, the torque mechanism 180 includes a pair of main body ribs 132,132 that protrude upward from the upper surface of a casing main body 120 (not shown, see FIG. 21C), a cylindrical shaft 146 of the cover 140, a pair of cover engagement projections 146a, 146a, a pair of cover trigger projections 147,147, the spring 182, and a torque plate 190. The cylindrical shaft 146 protrudes from the center of the lower surface of the cover 140. The pair of cover engagement projections 146a, 146a project from the outer circumferential surface of the cylindrical shaft 146. The pair of arc-shaped cover trigger projections 147,147 protrude from the lower surface of the cover 140 to be positioned inward the main body ribs 132,132.

The spring 182 is a torsion spring interposed between the casing main body 120 and the cover 140. The spring 182 is received in space of the cylindrical shaft 146 and passes through the torque plate 190 to span between the cover 140 and the casing main body 120. This arrangement enables the spring 182 to accumulate the pressing force with a clockwise rotation of the cover 140.

The torque plate 190 is a thin disk plate made of a resin, and has a through-hole and guide slots around the rotational axis of the cover 140. The torque plate 190 has a center aperture 191 formed on the center thereof. The cylindrical shaft 146 of the cover 140 passes through the center aperture 191. The pair of elastic torque pieces 194,194 are formed around the circumference of the center aperture 191. Each of the elastic torque pieces 194,194 is a cantilever arc piece that extends from a support end 194a and has a plate engagement element 194b that protrudes toward the center of the aperture 191 and a leg 194d formed on the free end of the elastic torque piece 194.

A pair of arc-shaped rib guides 193,193 are formed in the torque plate 190. The main body rib 132 is slidably set in the rib guide 193. The main body rib 132 moves forwards and backwards along the rib guide 193 between a first end 193a and a second end 193b of the rib guide 193. The main body rib 132 is an arc-shaped member along the rib guide 193, and has a pair of engagement projections 132a, 132b that protrude from the inner circumference thereof. A guide element 132c is formed between the pair of engagement projections 132a, 132b on the inner circumference of the main body rib 132 to slidably support the cover trigger projection 147. Support ends 132e, 132f are respectively formed near to the engagement projections 132a, 132b on the main body rib 132. The support end 132e supports the leg 194d of the elastic torque piece 194.

The following describes the operation of the torque mechanism 180. FIGS. 21A through 29C show operation of the torque mechanism 180 in response to opening and closing actions of a tank cap. FIGS. 21A through 27C show the operation of closing the tank cap, whereas FIGS. 27A through 29C show the operation of opening the tank cap. FIGS. 21A, 22A, 23A, 24A, 25A, 26A, 27A, 28A and 29A show the positional relationship of the cover 140, FIGS. 21B, 22B, 23B, 24B, 25B, 26B, 27B, and 29B show the positional relationship of the torque plate 190, and FIGS. 21C, 22C, 23C, 24C, 25C, 26C, 27C, 28C, and 29C show the positional relationship between a casing engagement element 120a of the casing main body 120 and the neck insertion notch FNd of the filler neck FN.

Figure 21A:
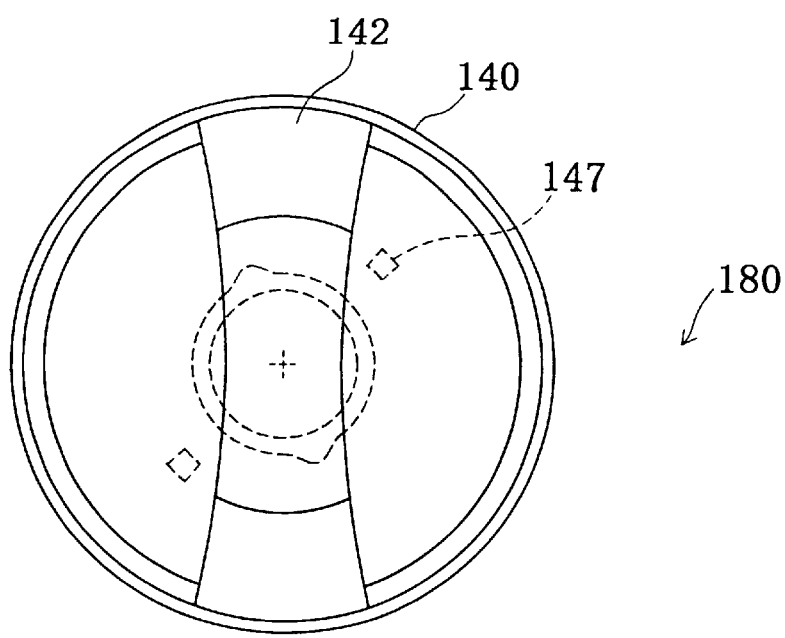
FIGS. 21A–21C show an initial state in a series of operations of the torque mechanism of the second embodiment.
Figure 21B:
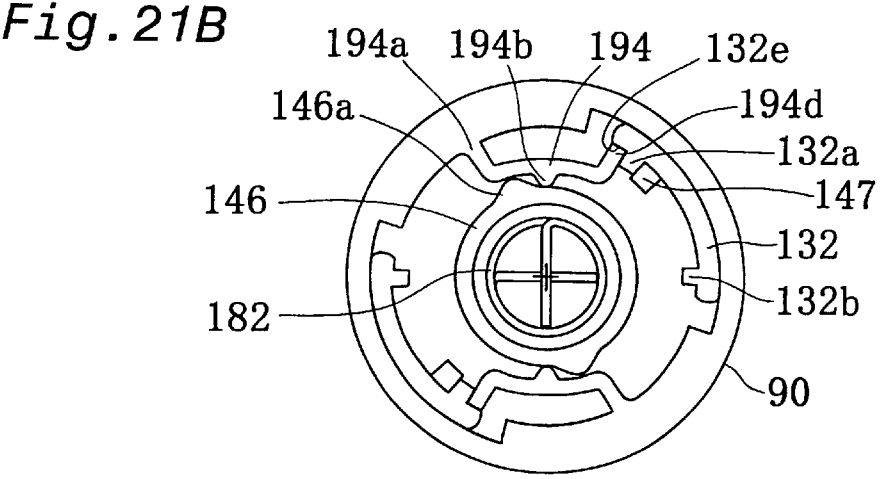
Figure 21C:
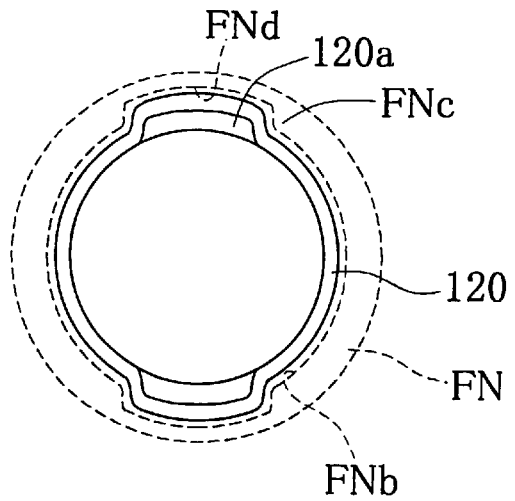
Figure 22A:
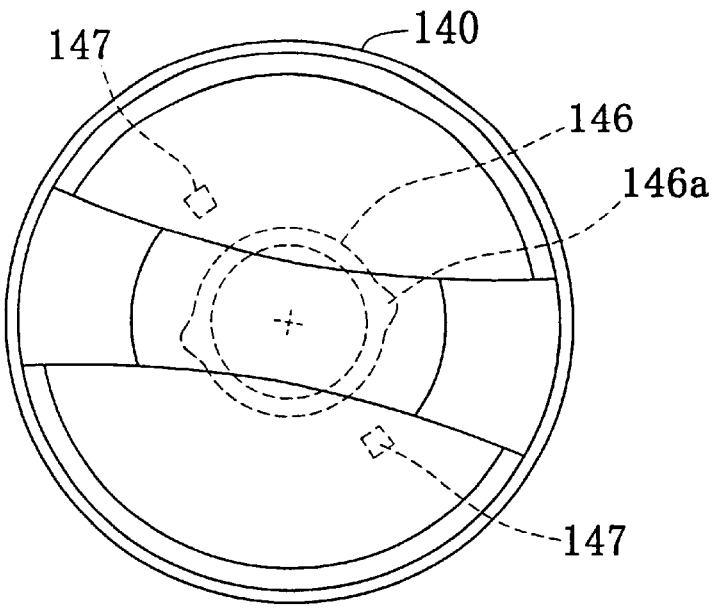
FIGS. 22A–22C show a state subsequent to the state of FIGS. 21A–21C in the series of operations of the torque mechanism of the second embodiment.
Figure 22B:
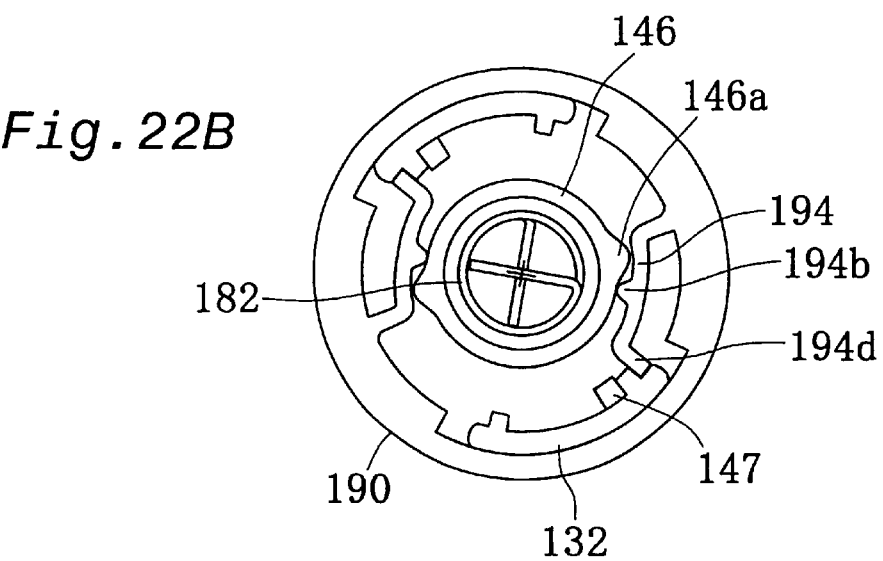
Figure 22C:
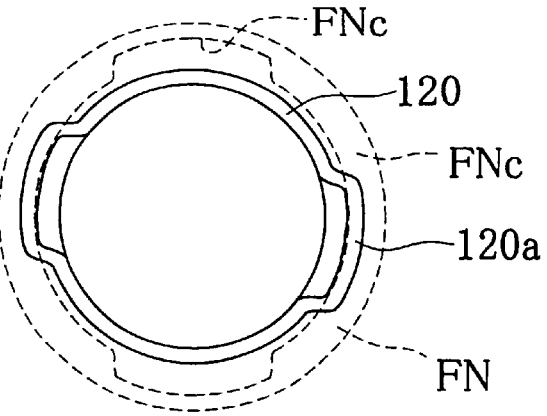
Figure 23A:
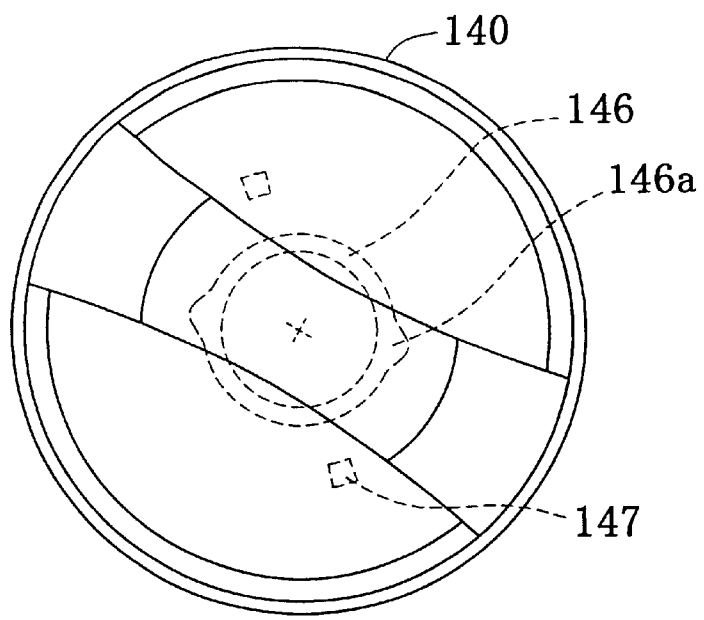
FIGS. 23A–23C show a state subsequent to the state of FIGS. 22A–22C in the series of operations of the torque mechanism of the second embodiment.
Figure 23B:
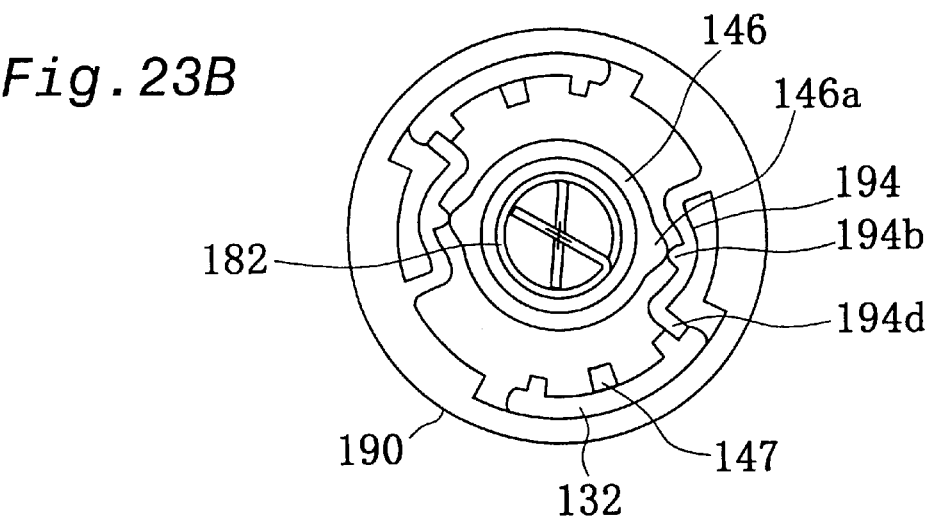
Figure 23C:
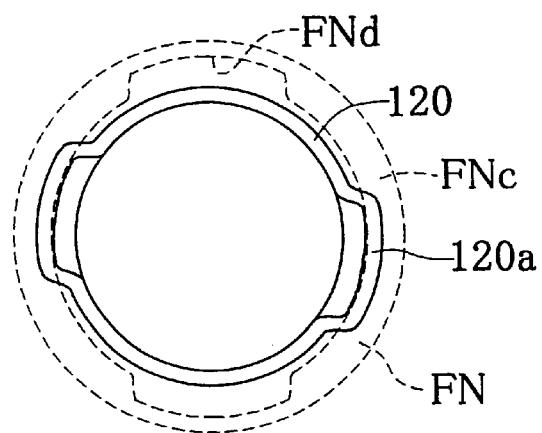

Referring to FIGS. 21A, 21B, and 21C, the user may hold the handle 142 of the cover 140 with a thumb and an index finger, positions the casing engagement element 120a formed on the casing main body 120 at the neck insertion notch FNd of the filler neck FN, and inserts the casing main body 120 in the axial direction into the open fuel supply inlet FNb of the filler neck FN. When the handle 142 of the cover 140 is located in the vertical direction in the drawing, the casing engagement element 120a is readily fit in the neck insertion notch FNd. This arrangement facilitates the attachment of the tank cap to the filler neck FN. As shown in FIG. 21B, in the torque mechanism 180, the pressing force of the spring 182 causes the main body rib 132 to engage with the elastic torque piece 194. The leg 194d of the elastic torque piece 194 is accordingly supported by the support end 132e of the main body rib 132.

Figure 24A:
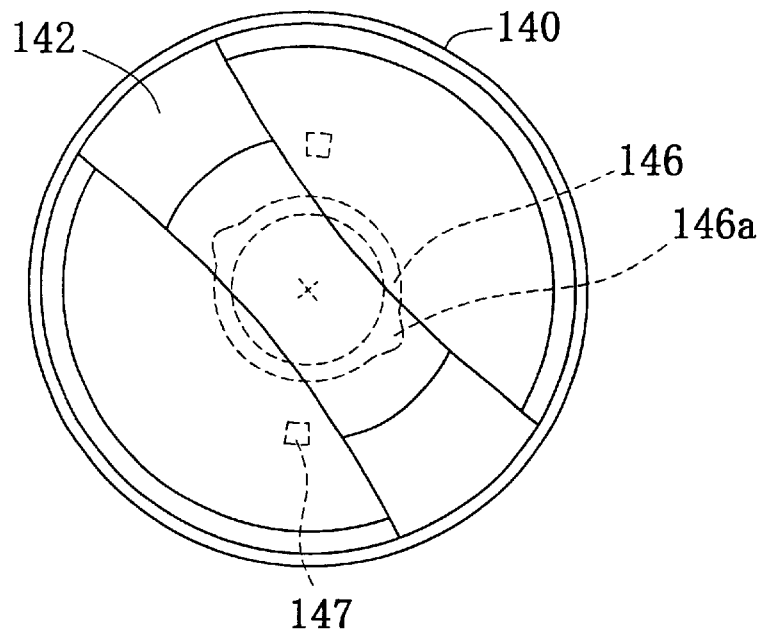
FIGS. 24A–24C show a state subsequent to the state of FIGS. 23A–23C in the series of operations of the torque mechanism of the second embodiment.
Figure 24B:
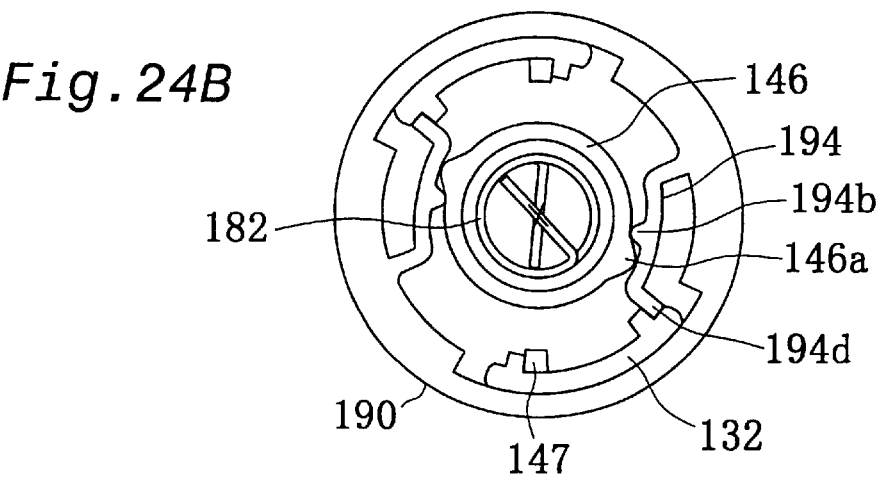

A clockwise rotational force is applied to the cover 140 in the above state in order to close the fuel supply inlet FNb of the filler neck FN with the tank cap. The torque mechanism 180 carries out a series of processes shown in FIGS. 21A through 27C. The clockwise rotational force applied to the cover 140 is transmitted to the torque plate 190 through the engagement of the cover engagement projection 146a of the cover 140 with the plate engagement element 194b of the torque plate 190, to rotate the torque plate 190 clockwise. The clockwise rotation of the torque plate 190 causes the main body rib 132 of the casing main body 120 to press against the leg 194d of the elastic torque piece 194. This causes the cover 140, the torque plate 190, and the casing main body 120 to rotate integrally by approximately 100 degrees in the closing direction of the fuel supply inlet FNb. This makes the casing engagement element 120a engage with the opening engagement element FNc (the state of FIG. 22C). When a reaction force generated by the engagement force and applied to the cover 140 becomes equal to or greater than a predetermined rotational torque, the cover engagement projection 146a deflects the elastic torque piece 194 (the state of FIG. 23C) and rides over the plate engagement element 194b to a first non-engaged state, as shown in FIG. 24B. In the first non-engaged state, the cover 140 rotates by approximately 30 degrees. This process to the first non-engaged state gives the user a feeling of attachment through an audible click. The leg 194d of the elastic torque piece 194 is supported by the support end 132e of the main body rib 132, so that the elastic torque piece 194 is not readily deflected. This arrangement requires a large rotational torque to make the cover engagement projection 146a ride over the plate engagement element 194b, thereby giving the user a certain feeling of click.

Figure 24C:
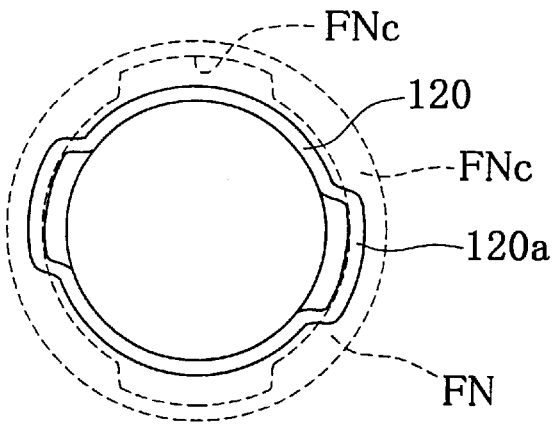
Figure 25A:
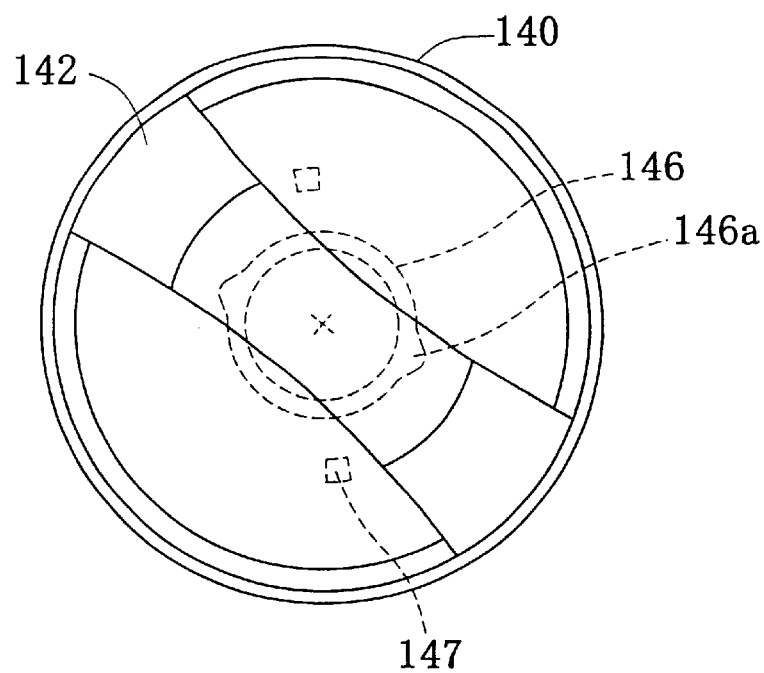
FIGS. 25A–25C show a state subsequent to the state of FIGS. 24A–24C in the series of operations of the torque mechanism of the second embodiment.
Figure 25B:
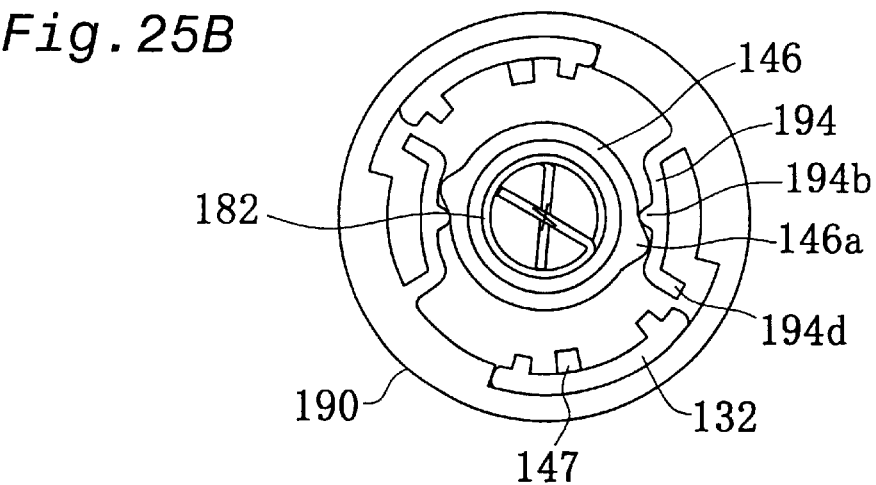
Figure 25C:
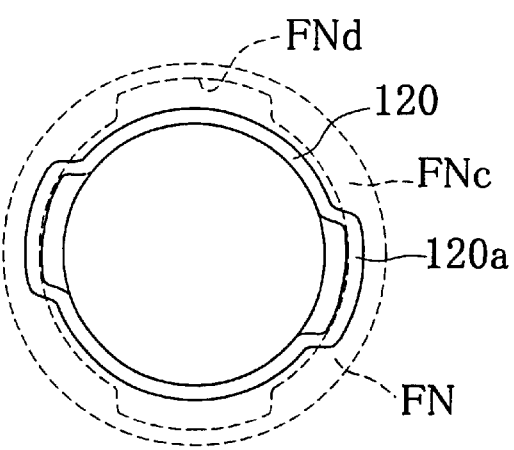
Figure 26A:
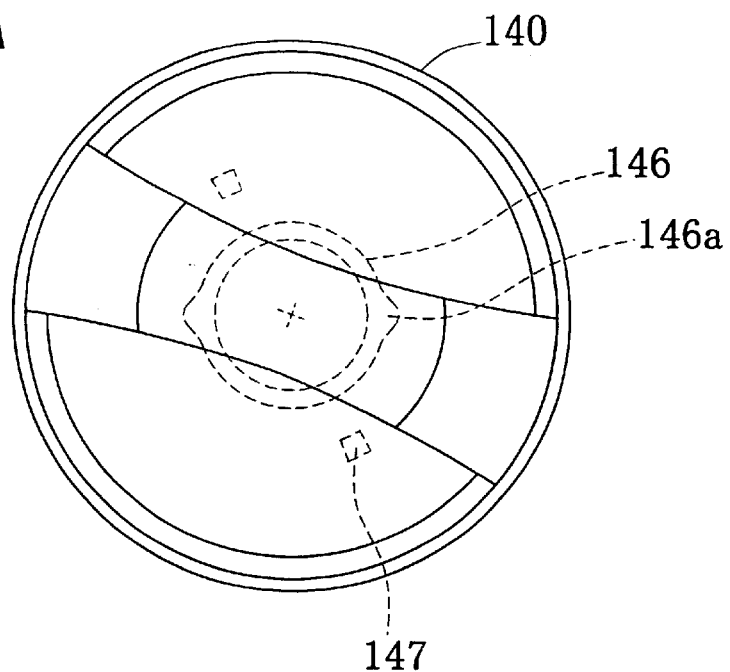
FIGS. 26A–26C shows a state subsequent to the state of FIGS. 25A–25C in the series of operations of the torque mechanism of the second embodiment.
Figure 26B:
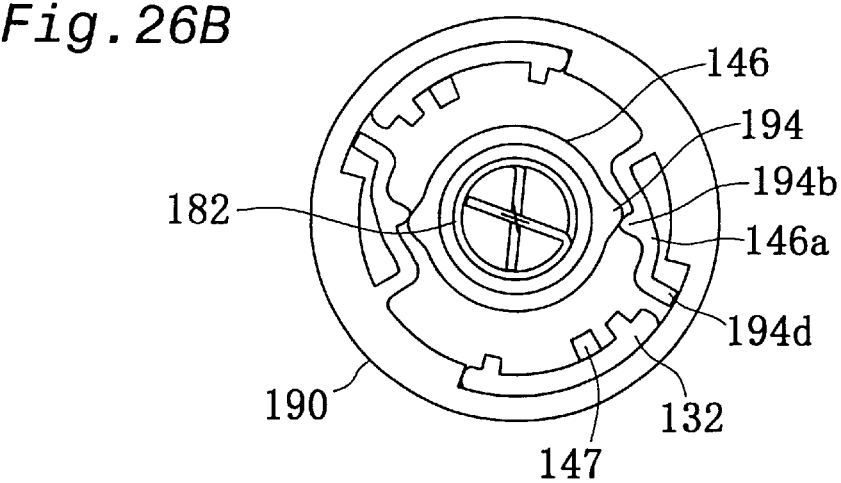
Figure 26C:
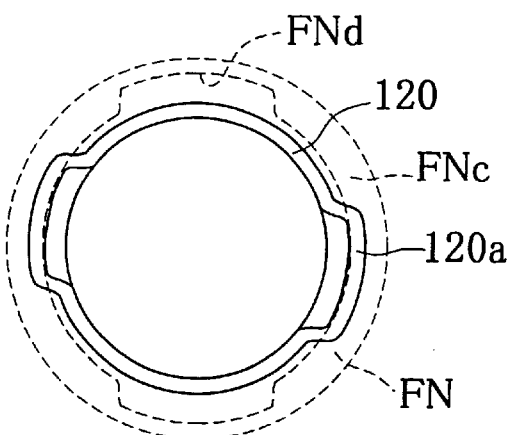

While the cover engagement projection 146a rides over the plate engagement element 194b, that is, while the cover 140 rotates relative to the casing main body 120, the spring 182 that spans between the cover 140 and the casing main body 120 is twisted by approximately 30 degrees and thereby accumulates the pressing force (see FIG. 24C).

When the user lets go of the handle 142 of the cover 140, the pressing force accumulated in the spring 182 rotates the cover 140 counterclockwise. The pressing force of the spring 182 accordingly rotates the cover 140 and the torque plate 190 counterclockwise through the engagement of the cover engagement projection 146a with the plate engagement element 194b. Since the casing main body 120 is attached to the filler neck FN, the main body ribs 132 integrally formed with the casing main body 120 are also attached to the filler neck FN. A counterclockwise rotation of the torque plate 190 in this state separates the leg 194d of the elastic torque piece 194 from the support end 132e of the main body rib 132 and sets the elastic torque piece 194 in the cantilevered state (the state of FIG. 25B). The cantilevered state of the elastic torque piece 194 enables the cover engagement projection 146a to readily ride over the plate engagement element 194b (the state of FIG. 26). The cover 140 is accordingly rotated counterclockwise, and the handle 142 of the cover 140 returns to the position of approximately 100 degrees. In this state, the fuel supply inlet FNb of the filler neck FN is closed with the tank cap (the state of FIG. 27A, 27B, 27C). The cover 140 is substantially integrated with the casing main body 120 in this state so that there are practically no lost motions.

Figure 27A:
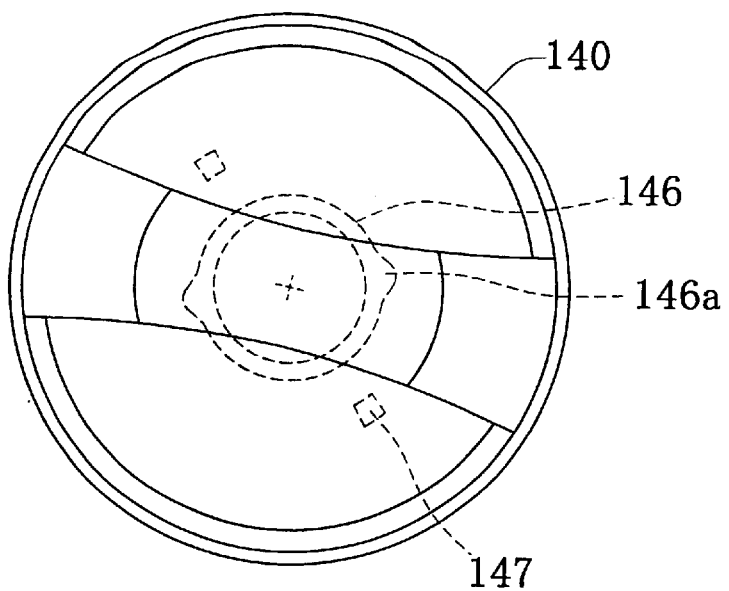
FIGS. 27A–27C show a state subsequent to the state of FIGS. 26A–26C in the series of operations of the torque mechanism of the second embodiment.
Figure 27B:
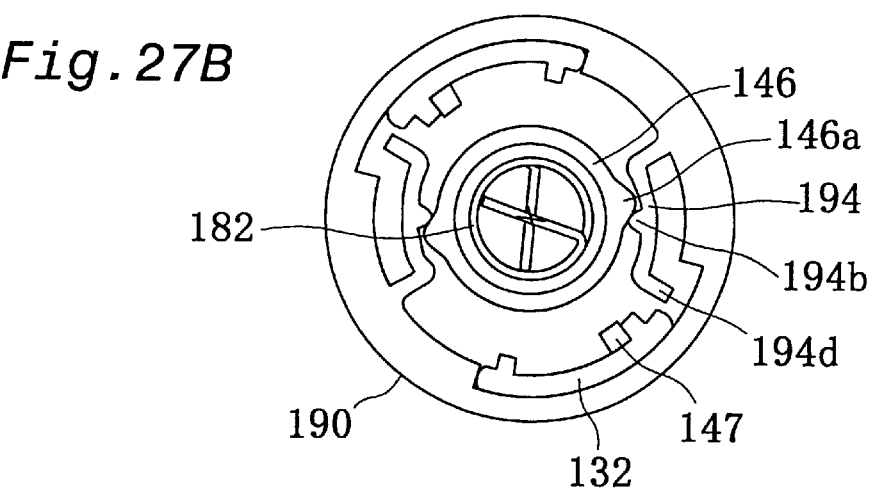
Figure 27C:
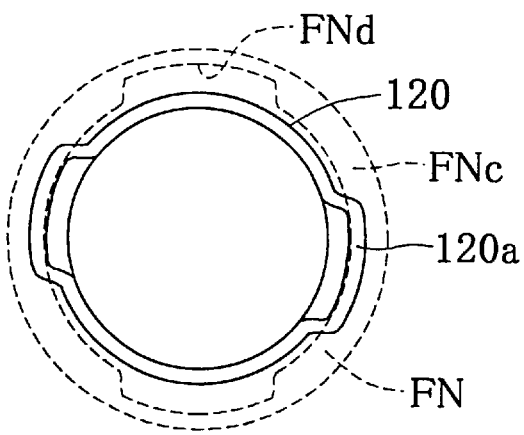

In order to release the tank cap and open the fuel supply inlet FNb of the filler neck FN, on the other hand, the user holds the handle 142 of the cover 140 between the thumb and the index finger and applies a counterclockwise rotational force to the cover 140, as shown in FIGS. 27A, 27B, and 27C. The counterclockwise rotational force applied to the cover 140 causes the cover trigger projection 147 to contact the engagement projection 132a to rotate the main body rib 132 and make the engagement projection 132a support the leg 194d of the elastic torque piece 194. This enables the cover 140, the torque plate 190, and the casing main body 120 to integrally rotate counterclockwise (the state of FIG. 28A, 28B, 28C). A further counterclockwise rotation of the cover 140 returns the positional relationship to the state of FIG. 21 via the state of FIG. 29. In this state, the casing engagement element 120a is released from the opening engagement element FNc of the filler neck FN so that the tank cap is removed from the filler neck FN. The positional relationship between the handle 142 of the cover 140 and the casing engagement element 120a of the casing main body 120 here returns to the initial state.

The user has a feeling of attachment through an audible click when the cover engagement projection 146a of the cover 140 rides over the plate engagement element 194b of the torque plate 190 in the process of closing the tank cap. This proves that the tank cap is clamped under a predetermined torque. Namely, the tank cap is clamped under a fixed torque, irrespective of the elasticity of the gasket.

Since the engagement of the casing engagement element 120a with the opening engagement element FNc requires the rotation of the tank cap only by a small angle of approximately 140 degrees, a plurality of rotating actions are not required to facilitate the attachment of the tank cap to the filler neck FN.

In the torque mechanism 180 of the second embodiment, the spring 182 accumulates the pressing force when a clockwise rotational torque is applied to the cover 140 to close the tank cap and causes the cover engagement projection 146a to ride over the plate engagement element 194b. When the user of the handle 142 of the cover 140, the accumulated pressing force of the spring 182 returns the positional relationship between the cover engagement projection 146a and the plate engagement element 194b to the initial state. This arrangement keeps the positional relationship that gives the user a feeling of attachment through an audible click in only one position. This facilitates the positioning of the handle 142 of the cover 140 relative to the casing engagement element 120a of the casing main body 120 and thereby simplifies the closing operation of the fuel supply inlet FNb of the filler neck FN.

Figure 28A:
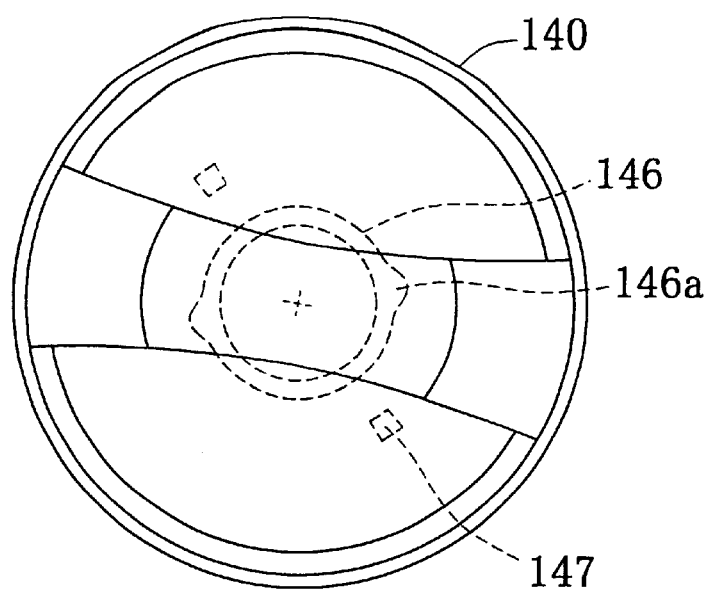
FIGS. 28A–28C show a state subsequent to the state of FIGS. 27A–27C in the series of operations of the torque mechanism of the second embodiment.
Figure 28B:
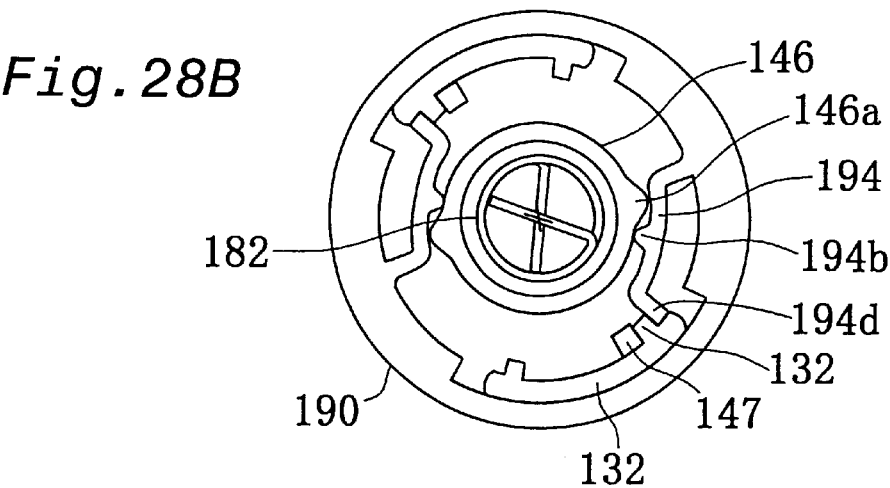
Figure 28C:
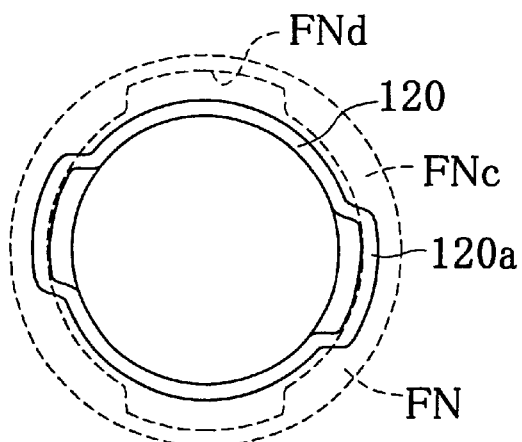
Figure 29A:
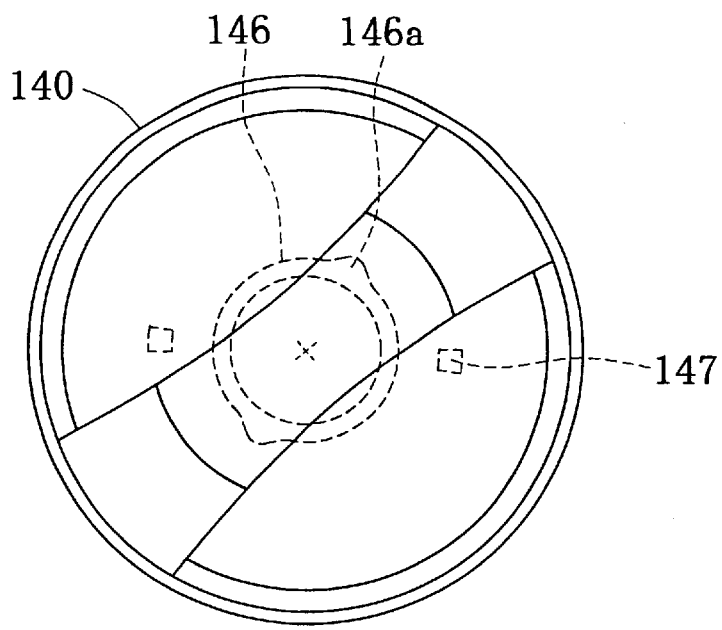
FIGS. 29A–29C show a state subsequent to the state of FIGS. 28A–28C in the series of operations of the torque mechanism of the second embodiment.
Figure 29B:
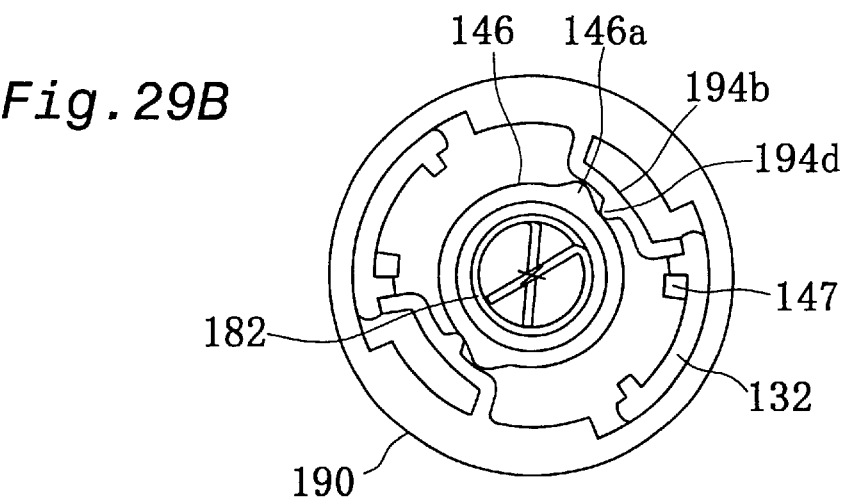
Figure 29C:
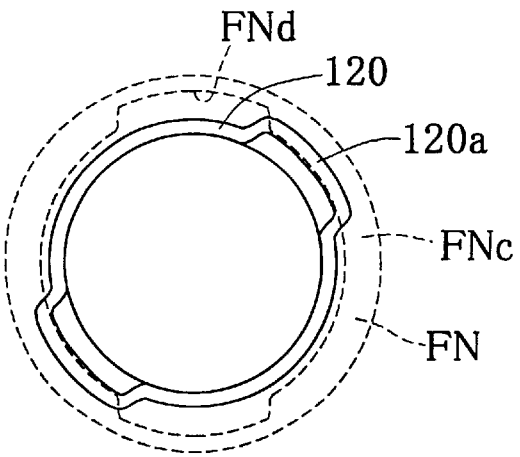

Since there are practically no lost motions for returning the cover 140 to the initial position in the process of opening the fuel supply inlet FNb of the filler neck FN from the state of FIG. 28A, 28B, 28C, the torque mechanism 180 of the second embodiment has excellent operability.

In the torque mechanism 180 of the second embodiment, the rotational torque giving the feeling of attachment through an audible click may be regulated easily by setting and varying a variety of parameters, for example, by varying the thickness of the elastic torque pieces 194 or by changing the position of the plate engagement elements 194b.

Figure 30:
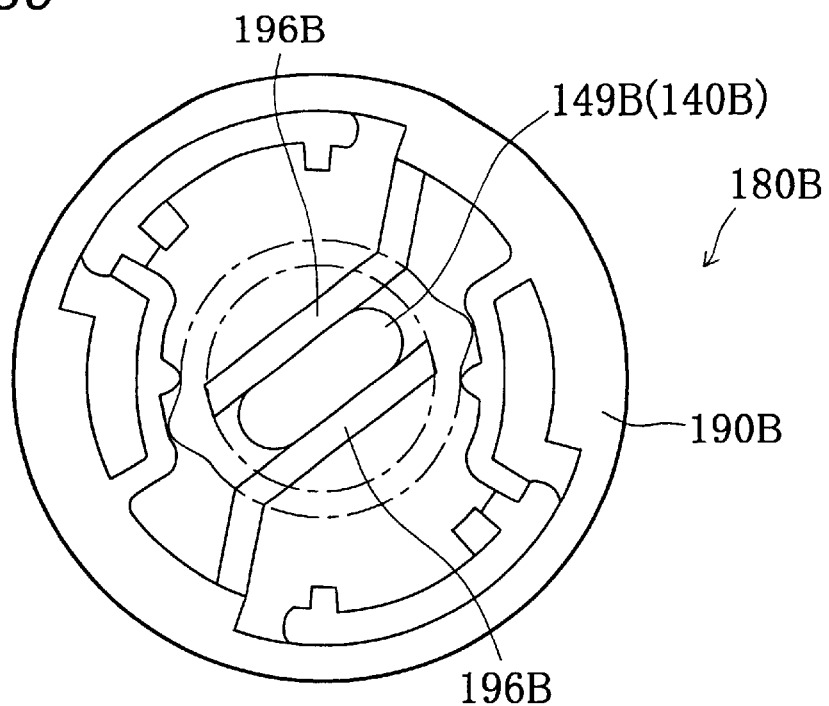
FIG. 30 shows one possible modification of the torque mechanism of the second embodiment.
Figure 31:
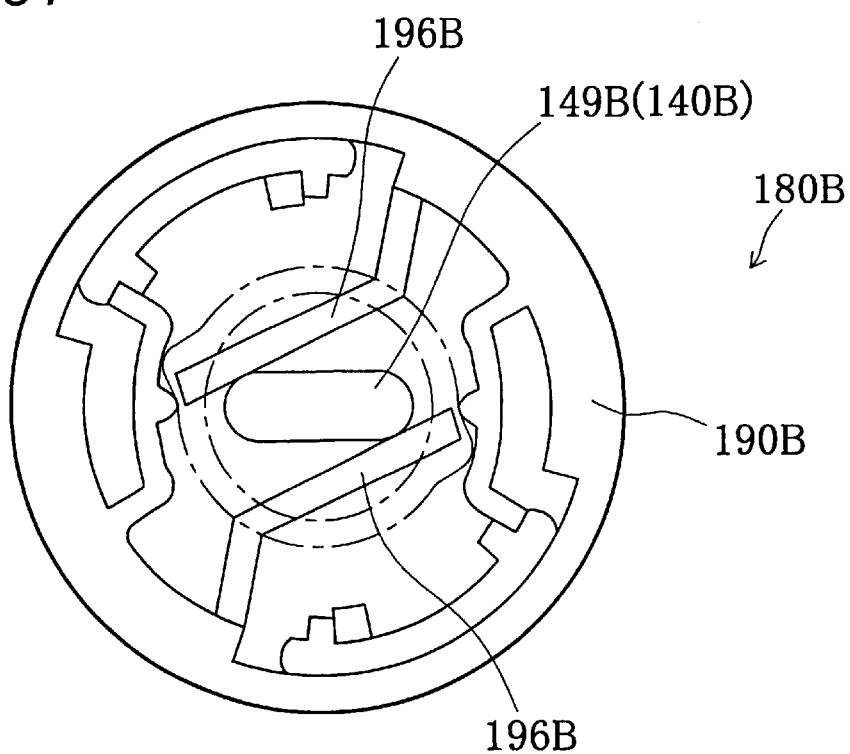
FIG. 31 shows a state subsequent to the state of FIG. 30 in the torque mechanism of the modified example of FIG. 30.

FIGS. 30 and 31 show one possible modification of the torque mechanism 180 of the second embodiment. A torque mechanism 180B of this modified example has a structure in which part of a resin torque plate 190B forms a return spring. A pair of spring pieces 196B, 196B protrude from the inner circumferential surface of the torque plate 190B in a cantilevered manner towards the rotational axis of a cover 140B. The central portions of the spring pieces 196B,196B hold therebetween an elliptical projection 149B that projects from the cover 140B. A rotation of the cover 140B integrally rotates the elliptical projection 149B and causes the elliptical projection 149B to extend the gap between the pair of spring pieces 196B,196B, as shown in FIG. 31, to accumulate the pressing force. The accumulated pressing force works to return the cover 140B to the original position when the user lets go of the cover 140B. The integrated arrangement of the spring pieces 196B,196B with the torque plate 190B desirably decreases the number of required parts.

Figure 32:
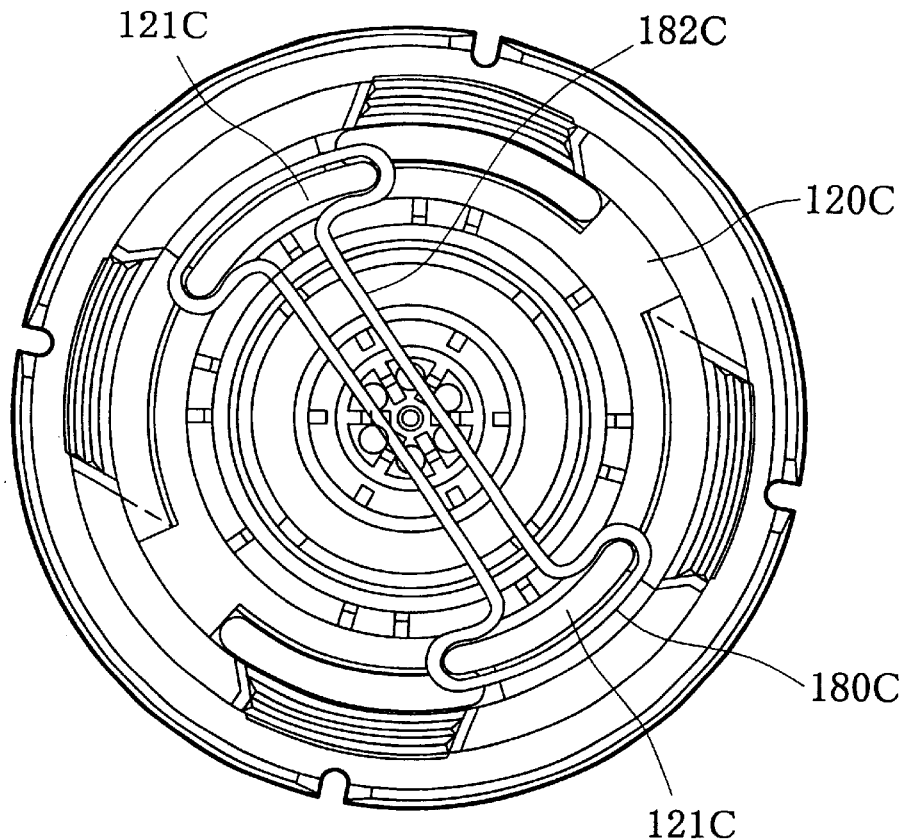
FIG. 32 shows another possible modification of the torque mechanism of the second embodiment.
Figure 33:
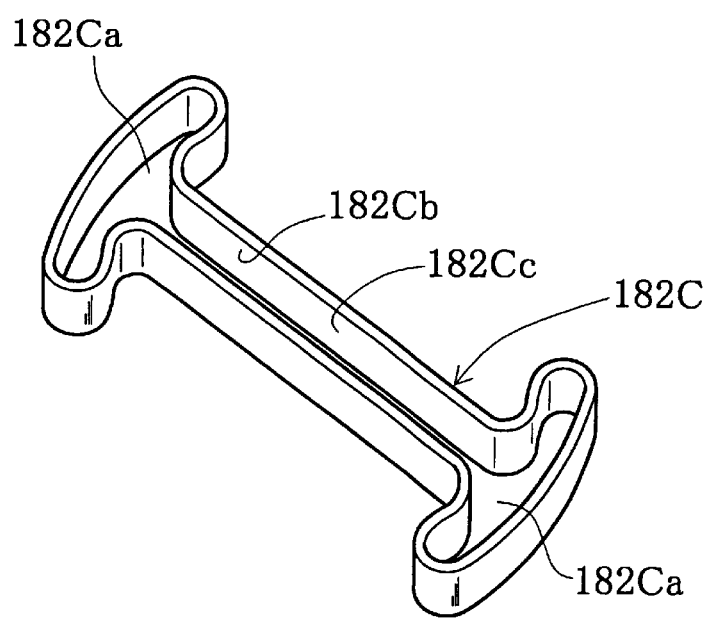
FIG. 33 is a perspective view illustrating a spring included in the torque mechanism of the modified example shown in FIG. 32.
Figure 34:
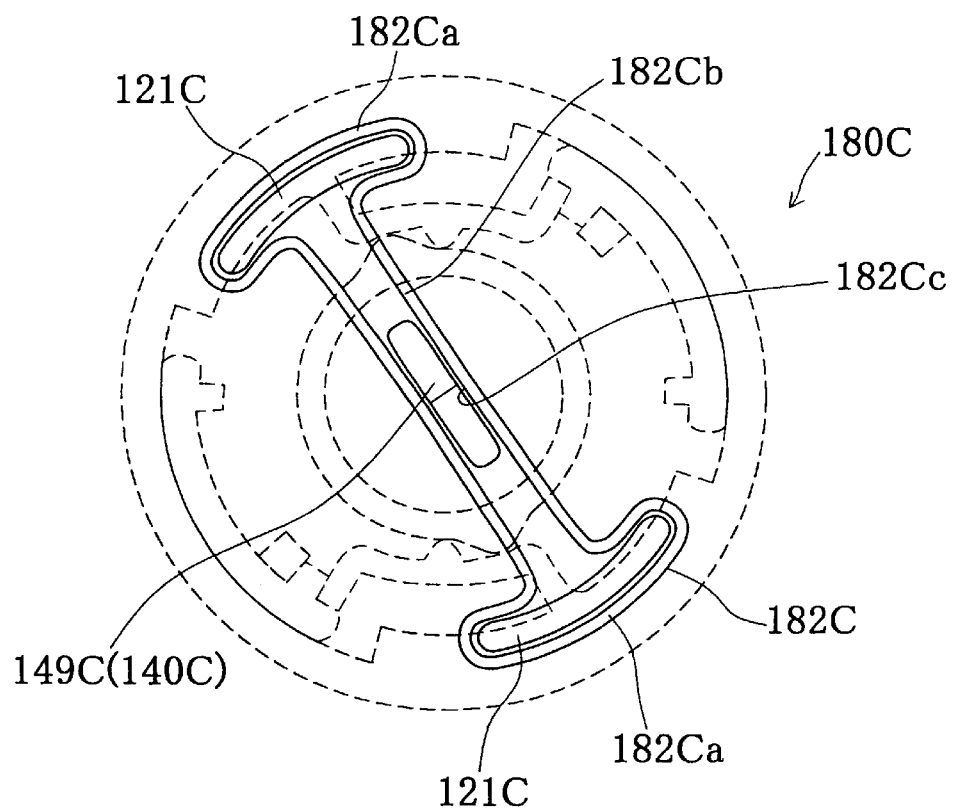
FIG. 34 shows one state in a series of operations of the torque mechanism of the modified example of FIG. 32.
Figure 35:
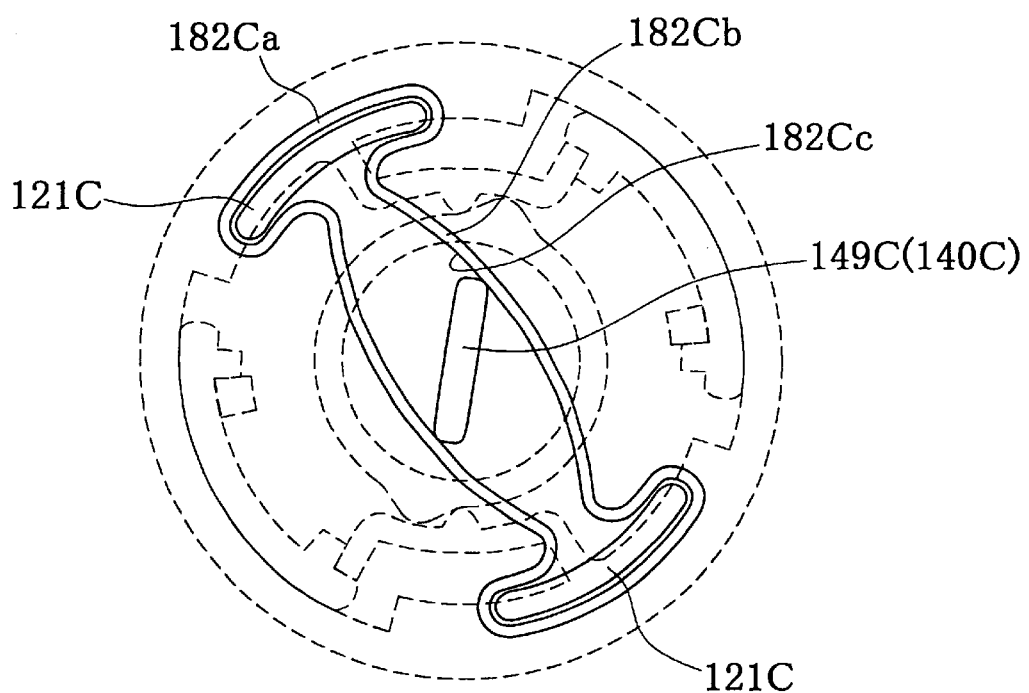
FIG. 35 shows a state subsequent to the state of FIG. 34 in the series of operations of the torque mechanism of the modified example of FIG. 32.
Figure 36:
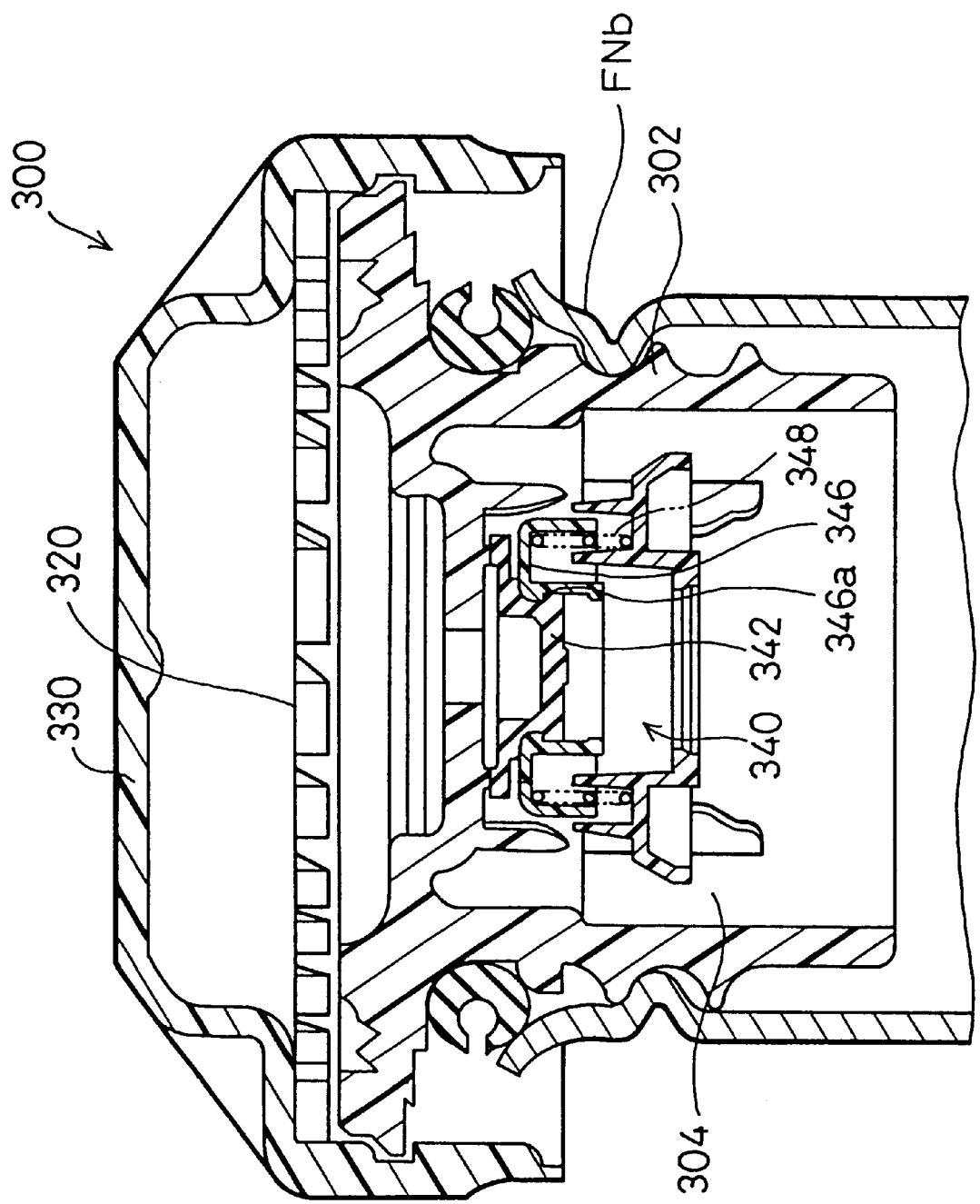
FIG. 36 is a sectional view illustrating a prior art tank cap.

FIGS. 32 through 35 show another possible modification of the torque mechanism 180 of the second embodiment. In a torque mechanism 180C, as shown in FIG. 32, an H-shaped spring 182C is set on the upper portion of a casing main body 180C. FIG. 33 is a perspective view illustrating the spring 182C. The spring 182C has a pair of fixation ends 182Ca,182Ca and a support groove 182Cc formed between the pair of fixation ends 182Ca,182Ca and defined by a support wall 182Cb. A pair of fixation projections 121C, 121C protrude from the upper portion of a casing main body 120C fit into the fixation ends 182Ca,182Ca so that the spring 182C is attached to the upper portion of the casing main body 120C. As shown in FIGS. 34 and 35, an elliptical projection 149C that protrudes from a cover 140C is set in the support groove 182Cc of the spring 182C. Rotation of the cover 140C from the state of FIG. 34 to the state of FIG. 35 causes the elliptical projection 149C to elastically deform the support wall 182Cb. This accumulates the return pressing force and generates a rotational force to return the cover 140C to the initial state.

The present invention is not restricted to the above embodiment, but there may be many modifications, changes, and alterations without departing from the scope or spirit of the main characteristics of the present invention. Some examples of possible modification are given below.

The embodiment discussed above regards the tank cap for the fuel tank of the automobile. The principle of the present invention is, however, applicable to any tanks of any structures, as long as the tank opening is closed with a cap.

The scope and spirit of the present invention are limited only by the terms of the appended claims.

What is claimed is:

1. A tank cap that opens and closes a tank opening and engages with an opening engagement element disposed on a circumference of said tank opening, said tank cap comprising:

a casing main body, which seals said tank opening, said casing main body including a casing engagement element configured to engage with said opening engagement element via rotation of said casing main body by a predetermined angle;

a handle rotatably mounted on said casing main body; and a torque mechanism interposed between said handle and said casing main body and configured to transmit rotational torque applied to said handle to said casing main body, wherein said torque mechanism includes
a handle engagement element disposed on an underside of said handle;
a torque plate interposed between said casing main body and said handle, said torque plate having a plate engagement element configured to engage with said handle engagement element; and
a main body engagement element disposed on said casing main body and configured to transmit rotational torque from said torque plate to said casing main body, wherein said plate engagement element is constructed and arranged to be in an engagement state, a first non-engaged state, or a second non-engaged state, wherein in said engagement state, said plate engagement element engages with said handle engagement element so that said rotational torque applied to said handle is transmitted to said casing main body when said handle is rotated in a closing direction of said tank opening, wherein in said first non-engaged state, said plate engagement element is released from said handle engagement element with a first rotational torque when said plate engagement element engages with said handle engagement element and said handle is rotated in said closing direction of said tank, and wherein in said second non-engaged state after being in said first non-engaged state, said plate engagement element is released from said handle engagement element with a second rotational torque when said handle is rotated in an opening direction of said tank, said second rotation torque being less than said first rotational torque.

2. The tank cap as claimed in claim 1, wherein said torque plate comprises a cantilevered elastic torque piece connected to said plate engagement element, said elastic torque piece being configured to deflect more significantly in said second non-engaged state than in said first non-engaged state when said plate engagement element is pressed against said handle engagement element.

3. The tank cap as claimed in claim 2, wherein said elastic torque piece has one end that is movable between a non-support position and a support position to be supported by said main body engagement element, whereby a degree of deflection of said elastic torque peace is changed between said first non-engaged state and said second non-engaged state.

4. The tank cap as claimed in claim 3, wherein said elastic torque piece contacts said main body engagement element and transmits rotational torque applied from said handle engagement element to said casing main body via said main body engagement element.

5. The tank cap as claimed in claim 1, wherein said torque mechanism further comprises a spring, said spring generating a pressing force to return a positional relationship between said handle and said casing main body to an initial state.

6. A tank cap in accordance with claim 5, wherein said spring is interposed between said casing main body and said torque plate, said spring accumulating the pressing force in response to a rotation of said handle in the opening direction of said tank opening, the pressing force accumulated in said spring being released so that said first non-engaged state is changed to said second non-engaged state.

7. The tank cap as claimed in claim 5, wherein said spring is interposed between said handle and said casing main body, said spring accumulating said pressing force in response to a rotation of said handle in said closing direction of said tank opening, said pressing force accumulated in said spring being released so that said first non-engaged state is changed to said second non-engaged state.

8. The tank cap as claimed in claim 5, wherein said spring is a coil spring that accumulates said pressing force when being twisted.

9. The tank cap as claimed in 5, wherein said spring is a leaf spring.

10. The tank cap as claimed in claim 9, wherein said leaf spring is secured on said torque plate and accumulates said pressing force in response to said rotation of said handle.

11. The tank cap as claimed in claim 9, wherein said leaf spring is integrally formed on said casing main body and accumulates said pressing force in response to said rotation of said handle.

12. The tank cap as claimed in claim 1, wherein said tank opening is a fuel supply inlet of a fuel tank mounted on an automobile.

13. A fuel tank, said fuel tank comprising:
a tank main body in which a fuel is stored;
a filler pipe having a tank opening through which a supply of fuel is fed; and
an opening engagement element disposed on a circumference of said tank opening; and
a tank cap that opens and closes,
wherein said tank opening and engages with said opening engagement element, wherein said tank cap comprising:
a casing main body that seals said tank opening, said casing main body having a casing, engagement element, which engages with said opening engagement element with rotation of said casing main body by a predetermined angle;
a handle rotatably mounted on said casing main body and rotates said casing main body in at least one of a closing direction of said tank opening and an opening direction of said tank opening; and
a torque mechanism interposed between said handle and said casing main body that transmits a rotational torque applied to said handle to said casing main body,
wherein said torque mechanism comprises:
a handle engagement element disposed on said handle;
a torque plate interposed between said casing main body and said handle that has a plate engagement element, said plate engagement element engaging with said handle engagement element;
said plate engagement element having an engagement state, a first non-engaged state, and a second non-engaged state,
said engagement state being a state in which said plate engagement element engages with said handle engagement element and said rotational torque applied to said handle is transmitted to said casing main body when said handle is rotated in said closing direction of said tank opening,
said first non-engaged state being a state in which said plate engagement element is released from said handle engagement element with a first rotational torque when said plate engagement element engages with said handle engagement element and said handle is rotated in said closing direction of said tank,
said second non-engaged state being a state in which said plate engagement element is released from said handle engagement element with a second rotational torque when said handle is rotated in the opening direction of said tank, said first rotational torque being less than said second rotational torque, and
a main body engagement element that is disposed on said casing main body and transmits a rotational torque from said torque plate to said casing main body.

14. A tank cap that opens and closes a tank opening and engages with an opening engagement element disposed on a circumference of said tank opening, said tank cap comprising:
a casing main body, which seals said tank opening, said casing main body including a casing engagement element configured to engage with said opening engagement element via rotation of said casing main body by a predetermined angle;
a handle rotatably mounted on said casing main body; and
a torque mechanism interposed between said handle and said casing main body and configured to transmit rotational torque applied to said handle to said casing main body,
wherein said torque mechanism includes:
a handle engagement element disposed on an underside of said handle;
a torque plate slidably interposed between said casing main body and said handle, said torque plate having a plate engagement element configured to engage with said handle engagement element as said handle rotates, and a deformable portion connected with said plate engagement element; and a main body engagement element disposed on said casing main body, said main body engagement element configured to be movable along a guide opening formed in said torque plate;

wherein, when a first rotational force is applied to said handle by a user in a first rotational direction in order to attach said casing main body in said tank opening, said handle engagement element engages with said plate engagement element and said main body engagement element engages with said torque plate while said main body engagement element is placed in a first position to restrict deformation of said deformable portion, whereby said first rotational force is transmitted from said handle to said casing main body via said torque plate to rotate said casing main body in said tank opening until said casing main body is tightly engaged in said tank opening, and then said deformable portion is deformed to release said engagement between said handle engagement element and said plate engagement element when said first rotational force causes a stress exceeding a first value between said handle engagement element and said plate engagement element, and wherein, when a second rotational force is applied to said handle in a second rotational direction opposite from said first rotational direction, said handle engagement element engages with said plate engagement element while said main body engagement element is placed in a second position to permit deformation of said deformable portion, whereby said second rotational force is transmitted from said handle to said torque plate to rotate said torque plate until said torque plate is restrained from moving, and then said deformable portion is deformed to release said engagement between said handle engagement element and said plate engagement element when said second rotational force causes a stress exceeding a second value between said handle engagement element and said plate engagement element, said second value being less than said first value.

* * * * *